US012567414B2

(12) United States Patent　　(10) Patent No.: US 12,567,414 B2
Samal　　(45) Date of Patent: Mar. 3, 2026

(54) SYSTEM AND METHOD FOR DETECTING A WAKEUP COMMAND FOR A VOICE ASSISTANT

(71) Applicant: Samsung Electronics Co., Ltd., Suwon-si (KR)

(72) Inventor: Ranjan Kumar Samal, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 18/492,177

(22) Filed: Oct. 23, 2023

(65) Prior Publication Data

US 2024/0079007 A1 Mar. 7, 2024

Related U.S. Application Data

(63) Continuation of application No. PCT/KR2023/012586, filed on Aug. 24, 2023.

(30) Foreign Application Priority Data

Sep. 5, 2022 (IN) .............................. 202241050570
Aug. 10, 2023 (IN) .............................. 2022 41050570

(51) Int. Cl.
*G10L 15/22* (2006.01)
*G10L 15/06* (2013.01)
*G10L 15/08* (2006.01)

(52) U.S. Cl.
CPC ............ *G10L 15/22* (2013.01); *G10L 15/063* (2013.01); *G10L 15/08* (2013.01);
(Continued)

(58) Field of Classification Search
CPC ....... G10L 15/22; G10L 15/063; G10L 15/08; G10L 2015/088; G10L 2015/223;
(Continued)

(56) References Cited

U.S. PATENT DOCUMENTS 11,361,763 B1 6/2022 Maas et al.
11,366,978 B2 6/2022 Kim et al.
(Continued)

FOREIGN PATENT DOCUMENTS

CN 106782536 A 5/2017
KR 10-2020-0045647 A 5/2020
(Continued)

OTHER PUBLICATIONS

Indian Office Action dated Jun. 23, 2025, issued in an India Patent Application No. 202241050570.
(Continued)

*Primary Examiner* — Michael Colucci
(74) *Attorney, Agent, or Firm* — Jefferson IP Law, LLP

(57) ABSTRACT

A method for detecting a wakeup command for a voice assistant is provided. The method includes receiving an audio signal from one or more sources and determining at least one of acoustic parameters or an environmental context of the user. Further, the method includes generating an embedding vector representation associated with the received audio signal and comparing the generated embedding vector representation with one or more prestored embedding vector representations. Furthermore, the method includes detecting the wakeup command in the received audio signal.

20 Claims, 17 Drawing Sheets

(52) U.S. Cl.
  CPC .. *G10L 2015/088* (2013.01); *G10L 2015/223*
              (2013.01); *G10L 2015/228* (2013.01)

(58) Field of Classification Search
  CPC .............. G10L 2015/228; G10L 25/84; G10L
              2015/226; G10L 15/16; G06N 3/092;
              G06N 5/01; G06N 7/01; G06N 20/20;
              G06N 3/088; G06N 3/0895; G06N 3/09;
              G06N 3/044; G06N 3/045; G06N 3/0464;
              G06N 3/047; G06N 3/0475
  See application file for complete search history.

(56) References Cited

U.S. PATENT DOCUMENTS

| | | |
|---|---|---|
| 11,694,696 B2 | 7/2023 | Kang et al. |
| 12,243,511 B1* | 3/2025 | Joly ..................... G10L 13/033 |
| 12,288,566 B1* | 4/2025 | Ganguly ............. G10L 21/0264 |
| 2016/0267913 A1 | 9/2016 | Kim et al. |
| 2019/0311715 A1 | 10/2019 | Pfeffinger et al. |
| 2020/0005789 A1 | 1/2020 | Chae |
| 2020/0125820 A1* | 4/2020 | Kim ....................... G06N 20/10 |
| 2020/0279558 A1 | 9/2020 | Li et al. |
| 2020/0312336 A1* | 10/2020 | Kang ....................... G06N 3/08 |
| 2021/0043190 A1* | 2/2021 | Wang .................... G10L 15/063 |
| 2021/0043204 A1 | 2/2021 | Hwang et al. |
| 2021/0174783 A1* | 6/2021 | Wieman .................. G10L 15/16 |
| 2021/0183367 A1 | 6/2021 | Sharifi et al. |
| 2021/0217431 A1* | 7/2021 | Pearson ................ G10L 21/013 |
| 2021/0272573 A1* | 9/2021 | Yousefi .................. G06N 3/044 |
| 2021/0326421 A1* | 10/2021 | Khoury ................. G10L 17/08 |
| 2022/0366914 A1* | 11/2022 | Moreno ................. G10L 17/18 |
| 2022/0399007 A1* | 12/2022 | Jose ....................... G06N 3/084 |
| 2022/0406324 A1* | 12/2022 | Shin .................... G10L 21/0208 |
| 2023/0038982 A1* | 2/2023 | Narayanan ............... H04R 3/04 |

FOREIGN PATENT DOCUMENTS

| | | |
|---|---|---|
| KR | 10-2020-0119377 A | 10/2020 |
| WO | 2018/086033 A1 | 5/2018 |

OTHER PUBLICATIONS

Extended European Search Report dated Jul. 15, 2025, issued in a European Patent Application No. 23863391.1.
International Search Report dated Dec. 7, 2023, issued in International Application No. PCT/KR2023/012586.

* cited by examiner

Figure 8:
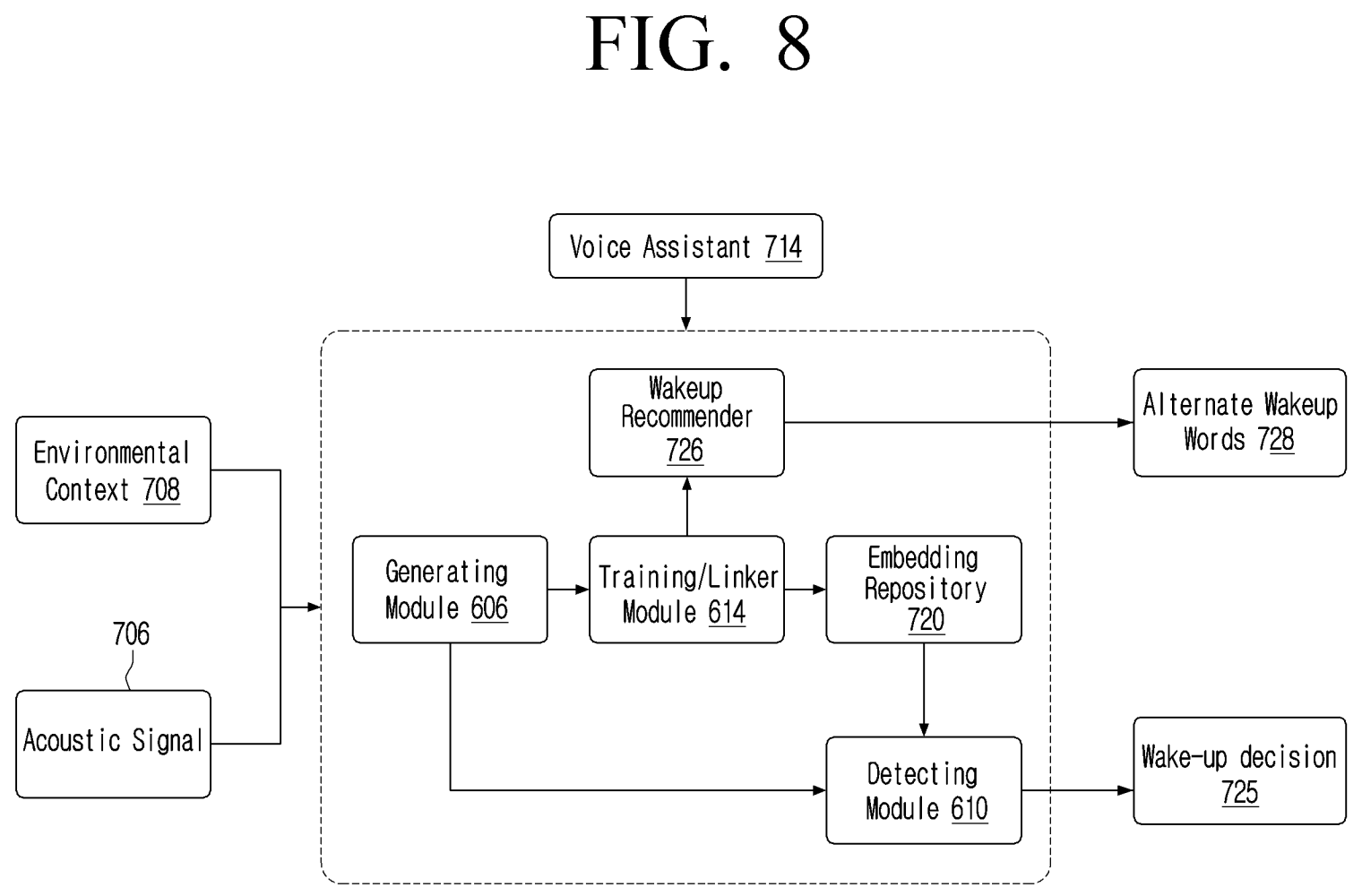

Voice Assistant 714

Environmental Context 708

Acoustic Signal

706

Generating Module 606

Training/Linker Module 614

Wakeup Recommender 726

Embedding Repository 720

Detecting Module 610

Alternate Wakeup Words 728

Wake-up decision 725

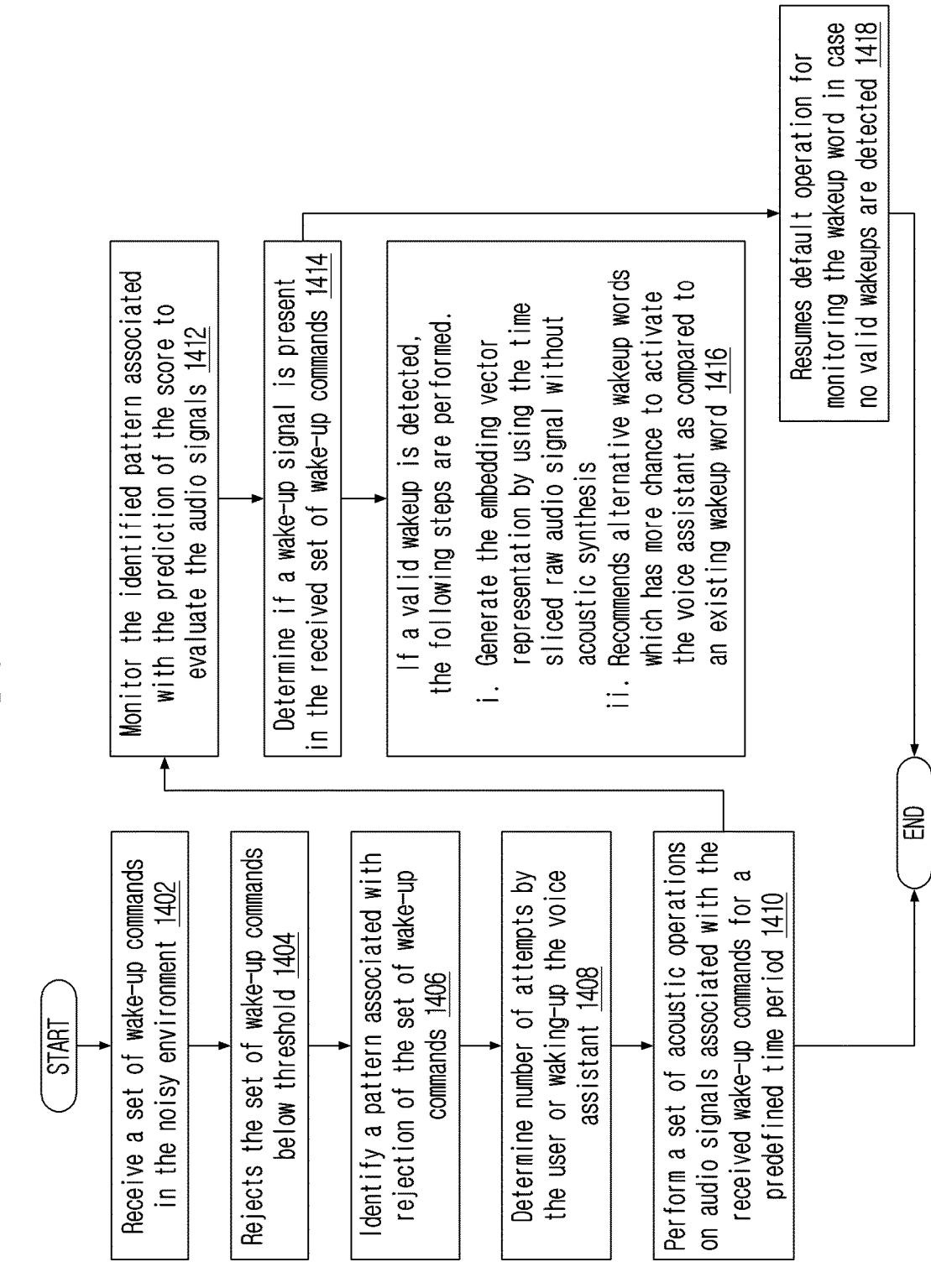

START

Receive a set of wake-up commands in the noisy environment 1402

Rejects the set of wake-up commands below threshold 1404

Identify a pattern associated with rejection of the set of wake-up commands 1406

Determine number of attempts by the user or waking-up the voice assistant 1408

Perform a set of acoustic operations on audio signals associated with the received wake-up commands for a predefined time period 1410

Monitor the identified pattern associated with the prediction of the score to evaluate the audio signals 1412

Determine if a wake-up signal is present in the received set of wake-up commands 1414

If a valid wakeup is detected, the following steps are performed.

i. Generate the embedding vector representation by using the time sliced raw audio signal without acoustic synthesis ii. Recommends alternative wakeup words which has more chance to activate the voice assistant as compared to an existing wakeup word 1416

Resumes default operation for monitoring the wakeup word in case no valid wakeups are detected 1418

END

Figure 16:
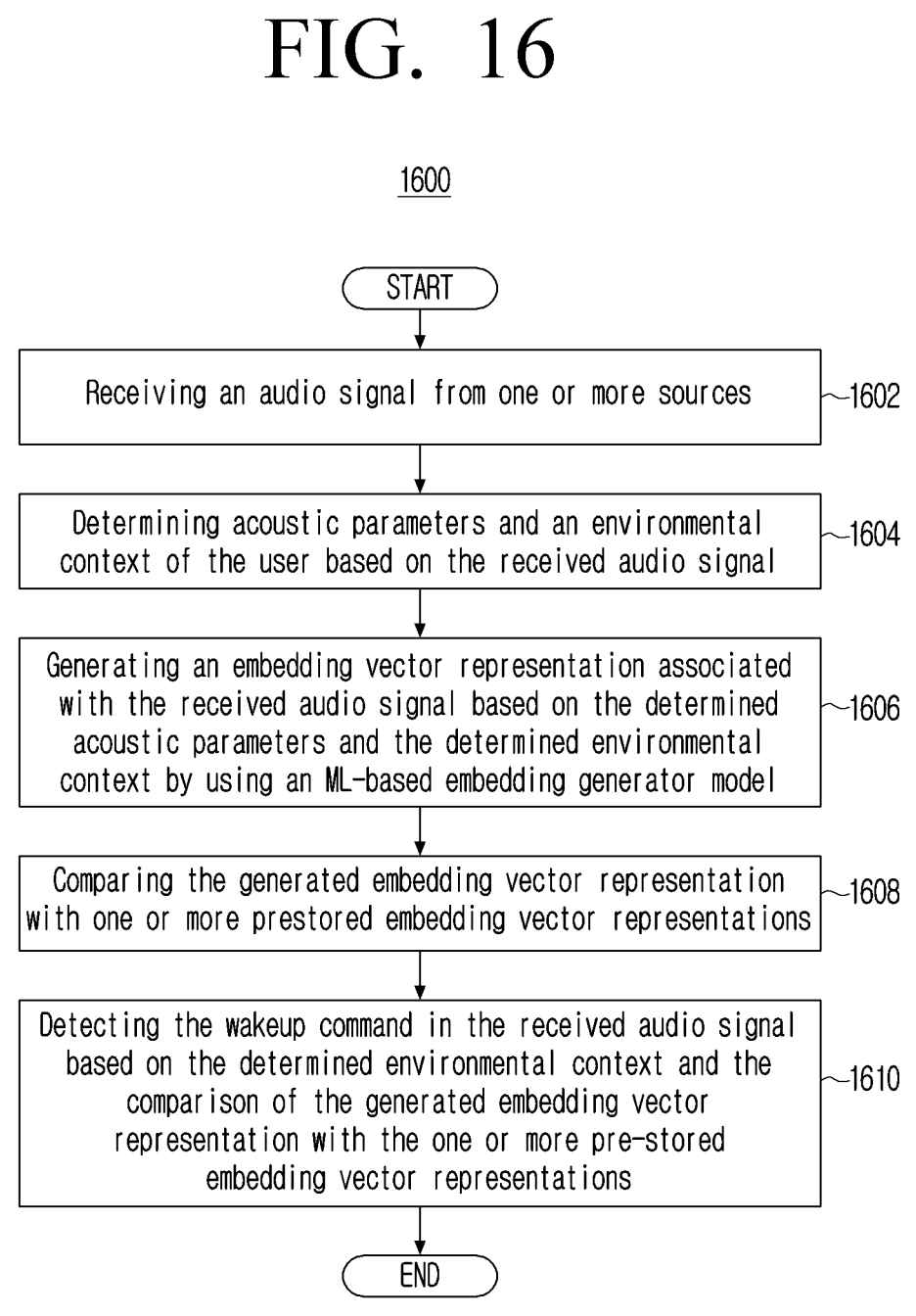

START

Receiving an audio signal from one or more sources ~1602

Determining acoustic parameters and an environmental context of the user based on the received audio signal ~1604

Generating an embedding vector representation associated with the received audio signal based on the determined acoustic parameters and the determined environmental context by using an ML-based embedding generator model ~1606

Comparing the generated embedding vector representation with one or more prestored embedding vector representations ~1608

Detecting the wakeup command in the received audio signal based on the determined environmental context and the comparison of the generated embedding vector representation with the one or more pre-stored embedding vector representations ~1610

END

SYSTEM AND METHOD FOR DETECTING A WAKEUP COMMAND FOR A VOICE ASSISTANT

CROSS-REFERENCE TO RELATED APPLICATION(S)

This application is a continuation application, claiming priority under § 365(c), of an International application No. PCT/KR2023/012586, filed on Aug. 24, 2023, which is based on and claims the benefit of an Indian Provisional patent application number 202241050570, filed on Sep. 5, 2022, in the Indian Intellectual Property Office, and of an Indian Complete patent application number 202241050570, filed on Aug. 10, 2023, in the Indian Intellectual Property Office, the disclosure of each of which is incorporated by reference herein in its entirety.

FIELD OF THE INVENTION

The disclosure relates to an audio processing. More particularly, the disclosure relates to a system and a method for detecting a wakeup command for the voice assistant implemented at an electronic device.

BACKGROUND

With the advancements in technology, voice assistants have revolutionized the way users interact with technology. The voice assistants have become an integral part of our daily lives, offering convenience, efficiency, and a hands-free approach to accessing information and performing tasks. The voice assistants are digital assistants which use voice recognition and natural language processing (NLP) technologies to provide information and perform tasks for the users through voice commands. Further, the voice assistants are commonly implemented in electronic devices, such as smartphones, smart speakers, televisions, and the like. The voice assistants can perform a wide range of tasks, such as providing weather updates, answering questions, playing music, setting alarms and reminders, sending messages, making phone calls, controlling smart home devices, and the like. For example, the voice assistant may be Bixby®.

In general, a wake-up command, also known as a wake-up word or an activation phrase, is used to trigger the voice assistant to start listening and responding to user commands. When the wake-up command is spoken by a user, the voice assistant becomes active and ready to receive instructions and perform tasks, accordingly. The wake-up command is generally a unimodal input through voice or a long button press.

FIG. 1A illustrates a block diagram 100 for executing wake-up commands for voice assistants in an environment according to the related art.

Referring to FIG. 1A, the wake-up commands are mainly executed by two components i.e., a keyword detector 102 and a keyword classifier 104. The keyword detector 102 includes a set of modules, such as a Mel frequency cepstral coefficients (MFCC) computation 106, a frame buffer 108, a small deep neural network (DNN) 110, and a hidden Markov model (HMM) scorer 112. Generally, the keyword detector 102 is always active and listens to speech signals 114 in the environment. The keyword detector 102 corresponds to a low computing digital signal processing (DSP) model. Further, the keyword classifier 104 includes a set of modules, such as a large DNN 116 and an HMM scorer 118. The keyword classifier 104 is a large module that is more precise and accurate in wake-up detection. Furthermore, Table 1 shows various examples of input and output of the keyword detector 102 and the keyword classifier 104.

TABLE 1

| Acoustic Input (Text format) | Keyword Detector (Low Compute DSP Model) | Keyword Verifier (Accurate Model) |
| --- | --- | --- |
| How are you Bigs Bee | Wakeup Accept | Wakeup Reject |
| Hi Bixby ®, How are you? | Wakeup Accept | Wakeup Accept |
| Hi, how are you? | Wakeup Reject | Not Processing |

Generally, the voice assistants are prone to noises, disturbances, and cross-talks in surrounding environments which affects the accuracy or reliability of wake-up command recognition. Excessive background noise or environmental factors, such as background conversations, loud music, or appliances can interfere with the voice assistant's ability to accurately recognize the wake-up command. The noise may make it difficult for the electronic device implementing the voice assistant to pick up the wake-up phrase. In some cases, the voice assistants might mistakenly interpret sounds or words similar to the wake-up command as the actual command, resulting in false positives. Such activation of the voice assistants may occur due to misinterpretation of speech patterns, unintended triggering by unrelated sounds, or environmental noises. Further, acoustic signals similar to the wakeup words cause activation of the voice assistants which often termed to be a false wakeup. Every time the same or similar noises appear around the electronic device, the electronic device implementing the voice assistant fails to discard or reject the false activation. A local wakeup fingerprinting using acoustic word embeddings (AWE) or equivalent technology is done in the electronic device. In the AWE, an embedding vector is generated for an acoustic word signal. A locally learned spurious wakeup is done using voice assistant wakeup services and a robust global wakeup model is sent to the electronic device. This wakeup word (acoustic speech word) contains environmental noise. The generated embedding vector is an indicative of user's acoustic speech features and environmental noise. Further, the generated embedding vector along with global embeddings from a wakeup service are used for building an-device personalized model, as explained further in FIG. 1B.

FIG. 1B illustrates a block diagram 120 depicting on-device wakeup fingerprinting according to the related art.

Referring to FIG. 1B, 122 represents wakeup audio signals and 124 represents wakeup trigger signals received from the user. In an embodiment of the disclosure, the wake-up acoustic signals which can be categorized as true positive, true negative, false positive, and false negative wakeups are termed as wakeup audio samples (wakeup audio signals). In an embodiment of the disclosure, the wakeup trigger signals are acoustic signals similar to wake-up audio samples but used in real-time environment. The wakeup trigger signals correspond to wakeup attempts from a real-user. Further, the wakeup audio signals 122 received from the false positive and false negative analysis are passed through an on-device wakeup fingerprinting unit 126. Further, the on-device wakeup fingerprinting unit 126 extracts features from the wakeup audio signals 122. More particularly, the on-device wakeup fingerprinting unit 126 extracts features including special features 126A, energy-based features 126B, and acoustic word embedding 126C from the wakeup audio signals 122. In an embodiment of the disclosure, the spectral features 126A correspond to frequency information present in an acoustic signal extracted using several types of Fourier Transform. Further, the energy-based features correspond to derivation of energy in a given acoustic signal. In an embodiment of the disclosure, the acoustic word embedding corresponds to embedding vector representation in an acoustic signal. The extracted features are stored in a user local fingerprint database (DB) 128. Furthermore, a matcher module 130 matches the wakeup trigger 124 against the user local fingerprint database 128 and generates a result marking a true wakeup or a false wakeup 131.

Further, the user local fingerprint DB transmits the extracted features to a server centralized wakeup service 132 for global learning. The server centralized wakeup service 132 includes a custom wakeup model generator 132A, a model sync 132B, and a wakeup fingerprint 132C. In an embodiment of the disclosure, the centralized wakeup service 132 corresponds to a service responsible for generating the AWE model by using the user speech recordings from the log server. Further, the centralized wakeup service 132 syncs the custom AWE model from server to on-device-on demand. The centralized wakeup service 132 generates embedding vectors and features corresponding to the user speech recordings and storing them into a global fingerprint vocal database. In an embodiment of the disclosure, the custom wakeup model generator 132A corresponds to a module which breaks user speech recordings into speech segments aligned to spoken words. Further, the custom wakeup model generator 132A categorizes the speech segments into words from a vocabulary. The custom wakeup model generator 132A performs unsupervised training of an AWE or equivalent embedding model from sub-set of the words from the vocabulary. In an embodiment of the disclosure, the model sync 132B communicates between the client device and wakeup serve. Further, the model sync 132B builds a custom wakeup model for a specific user based on specifications received from the client device. In an embodiment of the disclosure, for each of the speech segments extracted from the user's speech recordings, the wakeup fingerprint 132C generates features, such as spectral features, energy information, zero crossing count, and the like. All the generated features are stored into a global fingerprint vocab database. Additionally, the global fingerprint vocab database also contains association of the speech segment with a word.

Further, an on-device personalized model generator 134 downloads a server-generated global model learned from multiple users onto the electric device. The on-device personalized model generator 134 uses the global model to incrementally learn the personalized inputs of the user. Further, a global fingerprint vocabulary DB 136 includes features from high-resolution words which can be used for modeling wakeup. In an embodiment of the disclosure, a global fingerprint vocabulary DB 136 store features and embedding vectors corresponding to acoustic words extracted from user's speech recordings. The high-resolution words are clean acoustic signals segment from which the perception of corresponding word can be made out easily. Further, user-specific audio segments for a custom wakeup word are extracted from a user log server 138 for model generation via one or more tools 140. The tools 140 include personalized word extraction 142 and high-resolution (hi-res) word audio signals 144.

FIG. 2 illustrates a pictorial representation 200 depicting a scenario of a false wake-up of a voice assistant in an environment according to the related art.

Referring to FIG. 2, as depicted, 202 represents media devices in the environment of the user. In current environment, the voice assistant may experience noise due to media devices 202, such as radio, television, and/or human cross-talks 204. In human cross-talks 204, the humans may use words/phrases which are similar to the wake-up word/command of the voice assistant. For example, the human cross-talks 204 may be "Bigs Bee is very talented". Herein, the term "Bigs Bee" is similar to the term "Bixby®" which causes the voice assistant (Bixby® in this case) to wake-up based on a false wake-up word i.e., "Bigs Bee". 206 depicts the Bixby® enabled devices in which Bixby® wakes up without an actual voice wakeup trigger from the user.

FIG. 3 illustrates a pictorial representation depicting a scenario 300 of a true wake-up rejection according to the related art.

Referring to FIG. 3, in noisy environments, such as traffic, restaurants, mall crowd, and the like, the voice assistant often fails to recognize the wakeup words from the user of the electronic device. 302 depicts a noisy environment. The user uses the wake-up word "Hi Bixby®". The voice assistant fails to recognize the true wakeup words spoken in the noisy environment. 304 represent the Bixby® enabled devices in which Bixby® failed to recognize the wake-up word.

FIG. 4 illustrates a pictorial representation depicting a scenario 400 for learning wake-up word recognition according to the related art.

Referring to FIG. 4, the AI-enabled refrigerator learns to recognize true wakeup cases in the noisy environment. 402 represents the interaction between the AI-enabled refrigerator and a user. The user uses the wake-up word (i.e., Hi Bixby®) for triggering the Bixby®. The user is in the noisy environment where a blender is running. The Bixby® responded to the user based on the learned knowledge. The wakeup word recognition is improved over period of time in the kitchen while the blender is running. Thus, the AI-enabled refrigerator can recognize the wakeup word even when the blender is running. 404 represents the interaction between a smartphone and the user. The user uses the wake-up word (i.e., Hi Bixby®) for triggering the Bixby®. The user is in the noisy environment where a blender is running. However, in the same noisy environment, the Bixby® in the smartphone fails to recognize the wake-up word because the learned knowledge from the AI-enabled refrigerator is not transferred into the smartphone.

Thus, solutions of the related art implementing the voice assistants encounter multiple problems in detecting the wakeup command for the voice assistants. Specifically, the solutions of the related art fail to identify true and false wakeups. Furthermore, on-device wakeup models for voice assistant are not specifically tuned for every user which results in false wakeups due to various noise signals, such as, environment noise, cross-talks, or electrical equipment noise present in the environment. Custom wakeup models are weak in recognition of the wakeup word.

Accordingly, there is a need for a technique to overcome the above-identified problems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method for detecting a wakeup command for a voice assistant.

Additional aspects will be set forth in part in the description which follows and, in part, will be apparent from the description, or may be learned by practice of the presented embodiments.

In accordance with an aspect of the disclosure, a method for detecting a wakeup command for a voice assistant implemented in a user equipment (UE) is provided. The method includes receiving an audio signal from one or more sources. The one or more sources include at least one of a user of the UE or one or more environmental elements. Further, the method includes determining at least one of acoustic parameters or an environmental context of the user based on the received audio signal. Furthermore, the method includes generating an embedding vector representation associated with the received audio signal based on the at least one of determined acoustic parameters and determined environmental context by using a machine learning (ML)-based embedding generator model. The method also includes comparing the generated embedding vector representation with one or more prestored embedding vector representations. Further, the method includes detecting the wakeup command in the received audio signal based on determined environmental context and comparison of the generated embedding vector representation with the one or more pre-stored embedding vector representations.

In accordance with another aspect of the disclosure, a system for detecting a wakeup command for a voice assistant implemented in a UE is provided. The system includes one or more processors configured to receive an audio signal from one or more sources. The one or more sources include at least one of a user of the UE or one or more environmental elements. The one or more processors are also configured to determine at least one of acoustic parameters or an environmental context of the user based on the received audio signal. Further, the one or more processors are configured to generate an embedding vector representation associated with the received audio signal based on the at least one of determined acoustic parameters or determined environmental context by using an ML-based embedding generator model. The one or more processors are configured to compare the generated embedding vector representation with one or more prestored embedding vector representations. Furthermore, the one or more processors are configured to detect the wakeup command in the received audio signal based on determined environmental context and comparison of the generated embedding vector representation with the one or more prestored embedding vector representations.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other, aspects, features and advantages of certain embodiments of the disclosure will be more apparent from the following description taken in conjunction with the accompanying drawings, which:

FIG. 8 illustrates a block diagram depicting an operation of a system for detecting a wakeup command for a voice assistant according to an embodiment of the disclosure;

FIG. 11 illustrates a pictorial depiction representing a scenario for using one or more prestored embedding vector representations at different locations according to an embodiment of the disclosure;

FIG. 14 illustrates a process flow diagram for recommending an alternate wakeup word according to an embodiment of the disclosure;

FIG. 16 illustrates a process flow depicting a method for detecting a wakeup command for a voice assistant according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Figure 1A:
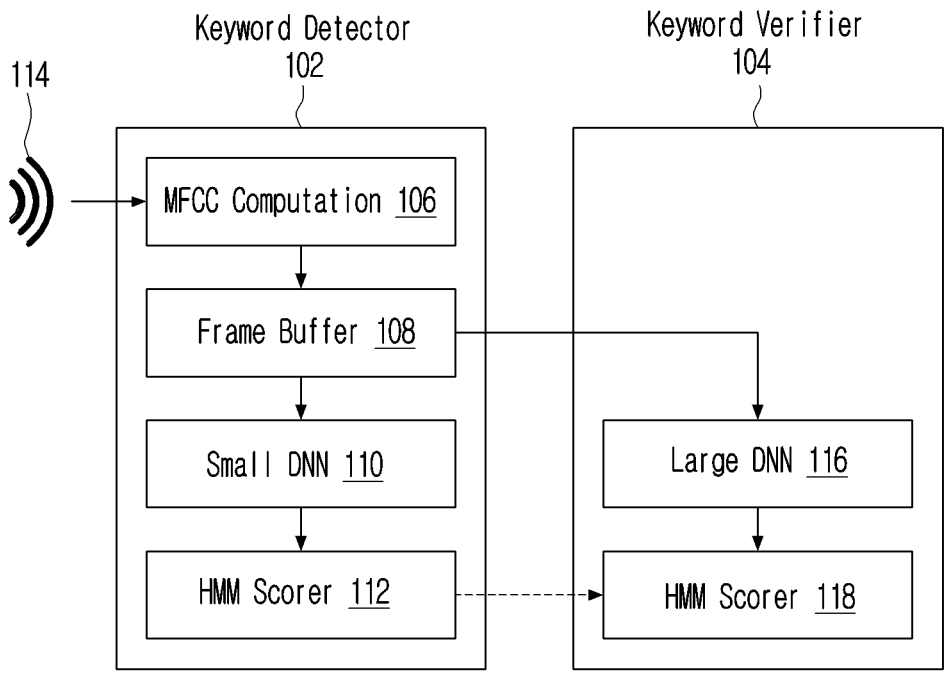
FIG. 1A illustrates a block diagram for executing wake-up commands for voice assistants in an environment according to the related art.
Figure 1B:
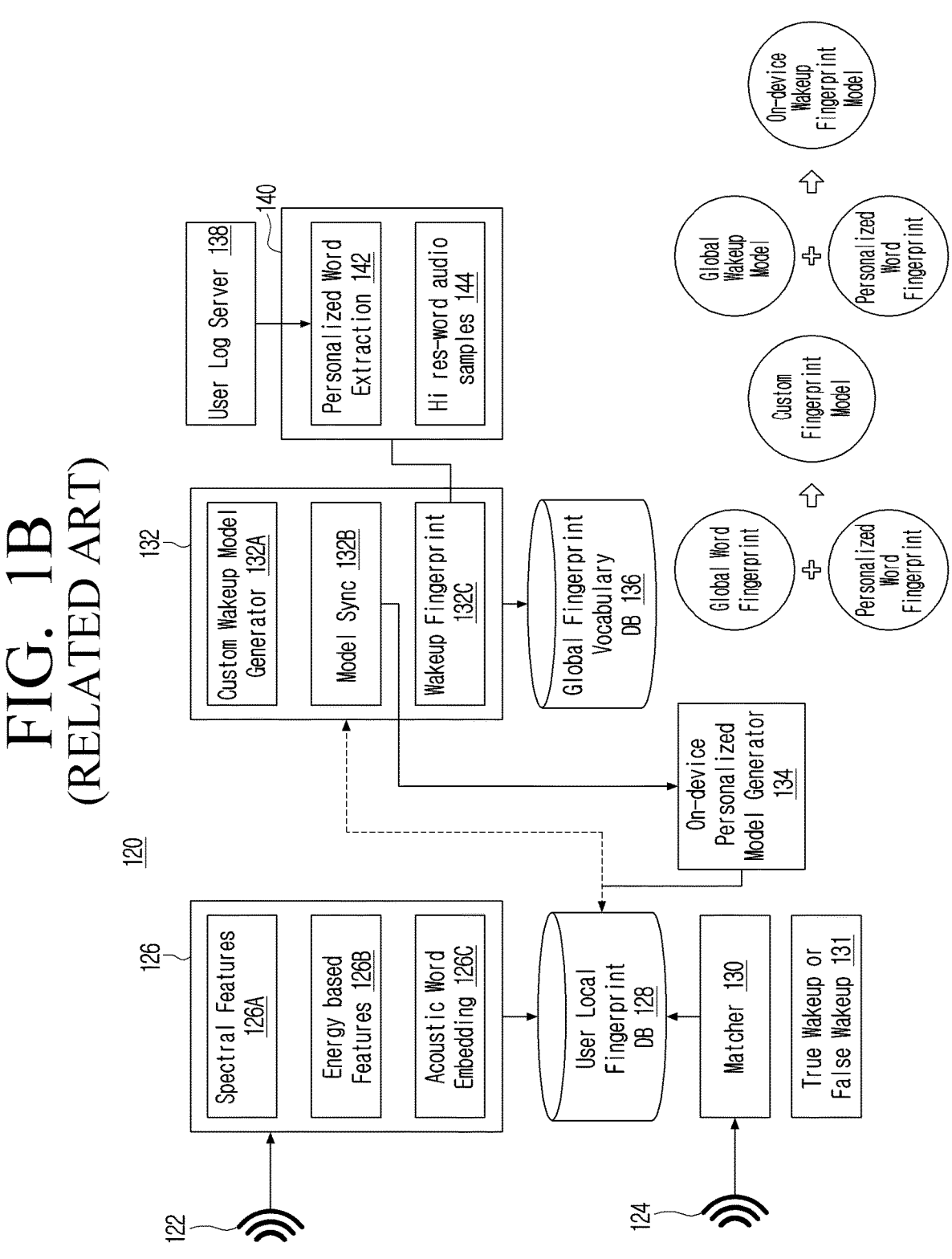
FIG. 1B illustrates a block diagram depicting on-device wakeup fingerprinting according to the related art.
Figure 2:
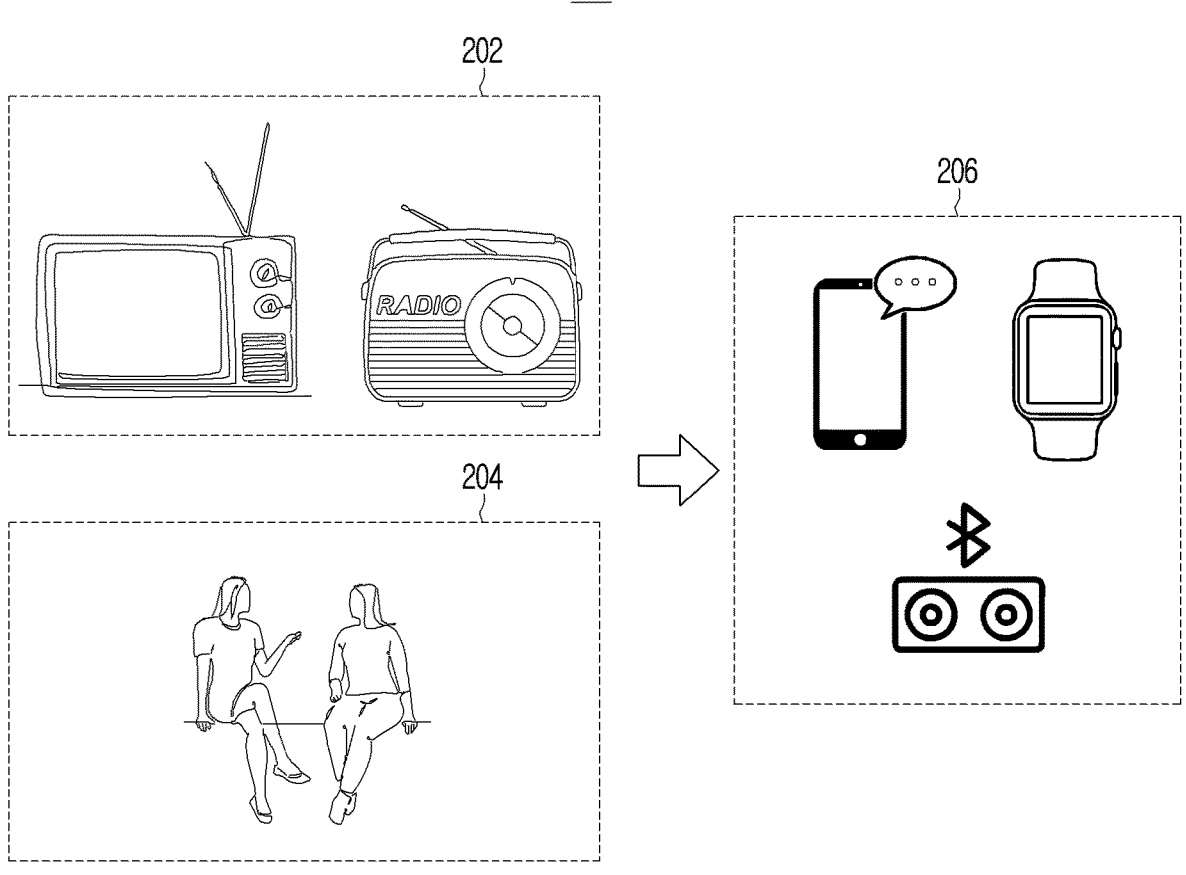
FIG. 2 illustrates a pictorial representation depicting a scenario of a false wake-up of a voice assistant in an environment according to the related art.
Figure 3:
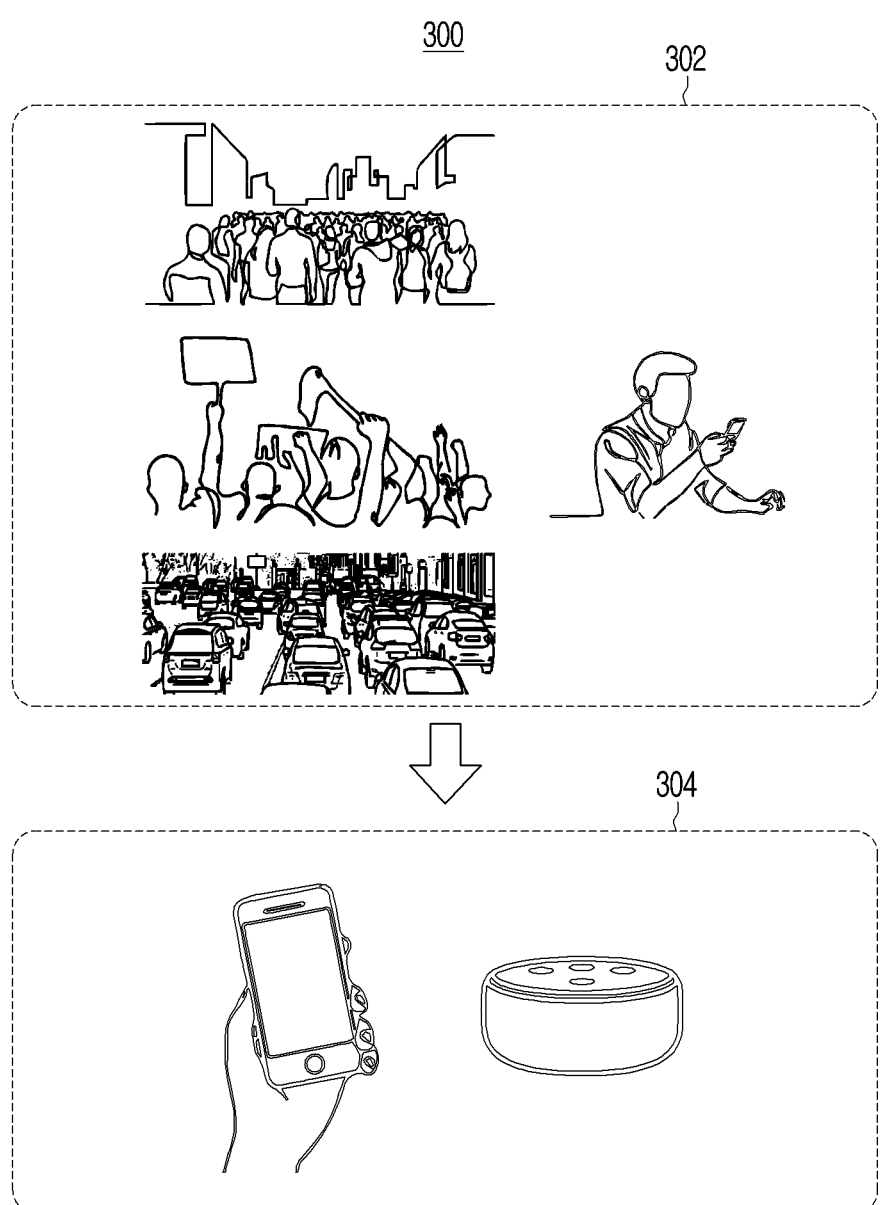
FIG. 3 illustrates a pictorial representation depicting a scenario of a true wake-up rejection according to the related art.
Figure 4:
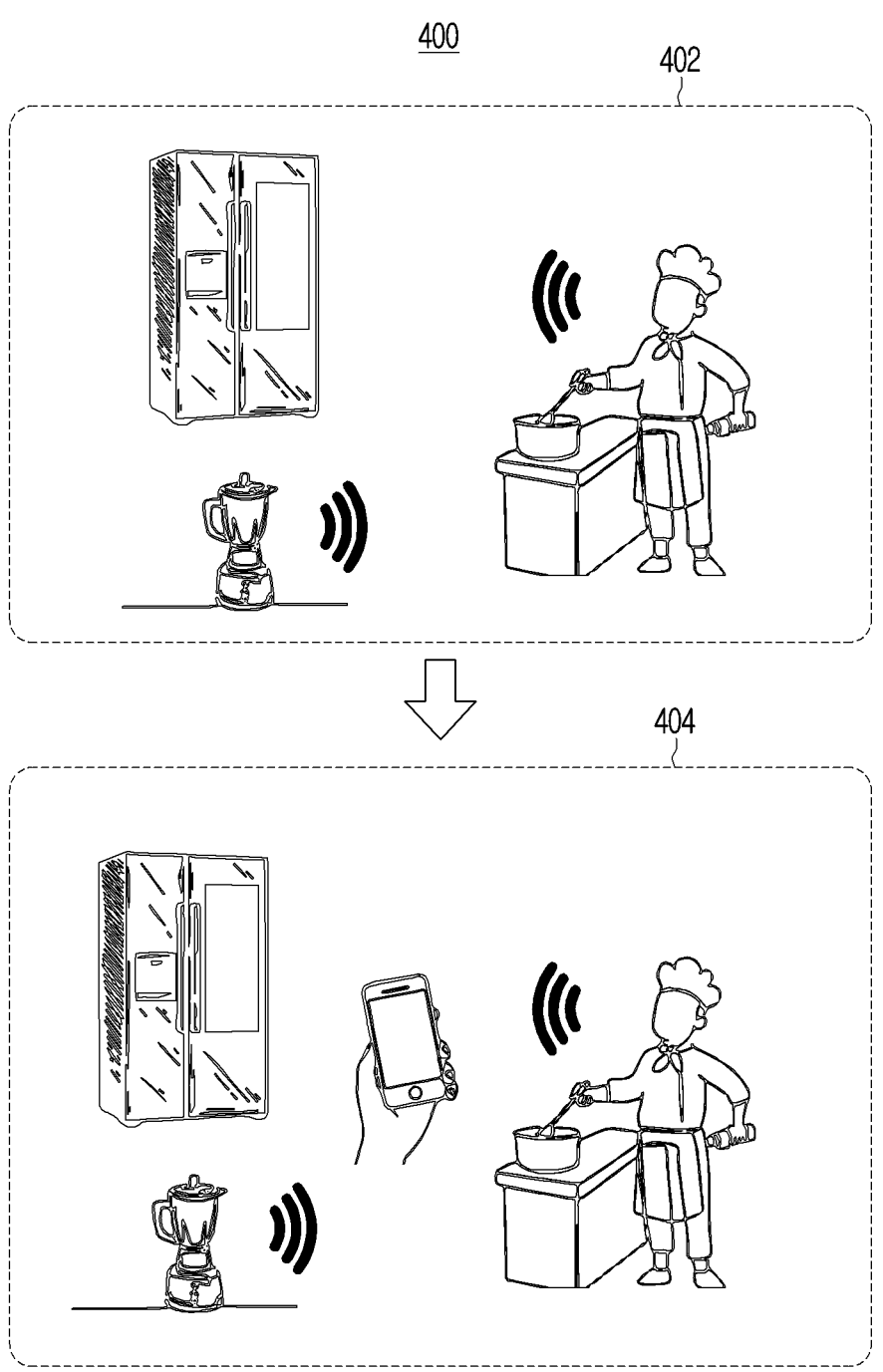
FIG. 4 illustrates a pictorial representation depicting a scenario for learning wake-up word recognition according to the related art.
Figure 5:
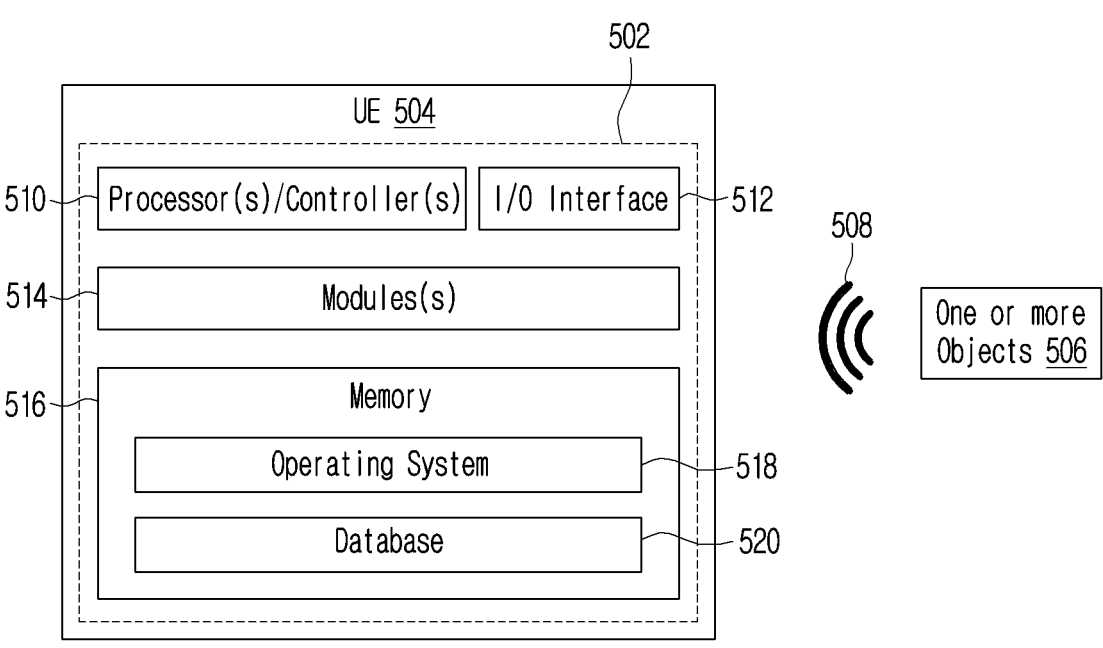
FIG. 5 illustrates a block diagram of a system for detecting a wakeup command for a voice assistant, according to an embodiment of the disclosure.

FIG. 5 illustrates a block diagram 500 of a system 502 for detecting a wakeup command for a voice assistant according to an embodiment of the disclosure.

Referring to FIG. 5, in an embodiment of the disclosure, the voice assistant is a digital assistant which uses voice recognition and natural language processing (NLP) technologies to provide information and perform tasks for users through voice commands. For example, the tasks may include, but not limited to, providing weather updates, answering questions, playing music, setting alarms and reminders, sending messages, making phone calls, controlling smart home devices, and the like. In an embodiment of the disclosure, the system 502 is implemented in the user equipment (UE) 504.

In an embodiment of the disclosure, the UE 504 may correspond to an electronic device in which the voice assistant is implemented. Examples of the UE 504 may include, but not limited to, a refrigerator, a television, a smartphone, a laptop, a speaker, a smartwatch, and the like. In an embodiment of the disclosure, a user may operate the UE 504 in an environment where the one or more objects 506 are located in the vicinity of the UE 504. The one or more objects 506 produce audio signals 508 which may be considered as noise for the voice assistant implemented at the UE 504. For example, the one or more objects 506 may include a grinder, a television, a radio, a speaker, and the like. Further, one or more activities in the vicinity of the UE 504 may also produce the audio signals 508. For example, the one or more activities may include people talking, thunder sounds, traffic noise, and the like.

The system 502 may include one or more processors/controllers 510, an input/output (I/O) interface 512, a plurality of modules 514, and a memory 516.

In an embodiment of the disclosure, the one or more processors/controllers 510 may be operatively coupled to each of the respective I/O interface 512, the plurality of modules 514, and the memory 516. In one embodiment of the disclosure, the one or more processors/controllers 510 may include at least one data processor for executing processes in virtual storage area network. The one or more processors/controllers 510 may include specialized processing units, such as integrated system (bus) controllers, memory management control units, floating point units, graphics processing units, digital signal processing units, etc. In one embodiment of the disclosure, the one or more processors/controllers 510 may include a central processing unit (CPU), a graphics processing unit (GPU), or both. The one or more processors/controllers 510 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors/controllers 510 may execute a software program, such as code generated manually (i.e., programmed) to perform the desired operation. In an embodiment of the disclosure, the processors/controllers may be a general purpose processor, such as the CPU, an application processor (AP), or the like, a graphics-only processing unit, such as the GPU, a visual processing unit (VPU), and/or an artificial intelligence (AI)-dedicated processor, such as a neural processing unit (NPU).

Further, the one or more processors/controllers 510 control the processing of input data in accordance with a predefined operating rule or machine learning (ML) model stored in the non-volatile memory and the volatile memory. The predefined operating rule or the ML model is provided through training or learning.

Here, being provided through learning means that, by applying a learning technique to a plurality of learning data, a predefined operating rule or the ML model of a desired characteristic is made. The learning may be performed in a device itself in which ML according to an embodiment is performed, and/or may be implemented through a separate server/system.

Furthermore, the ML model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-network.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

The one or more processors/controllers 510 may be disposed in communication with one or more input/output (I/O) devices via the respective I/O interface 512. The I/O interface 512 may employ communication code-division multiple access (CDMA), high-speed packet access (HSPA+), global system for mobile communications (GSM), long-term evolution (LTE), WiMax, or the like, etc.

The one or more processors/controllers 510 may be disposed in communication with a communication network via a network interface. In an embodiment of the disclosure, the network interface may be the I/O interface. The network interface may connect to the communication network to enable the connection of the UE 504 with one or more other UEs. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, and the like. Details on the one or more other UEs are elaborated in further paragraphs of the disclosure with reference to at least FIG. 6.

In an embodiment of the disclosure, the one or more processors 510 is configured to receive an audio signal from one or more sources. The one or more processors 510 are also configured to determine acoustic parameters, an environmental context, or a combination thereof of the user based on the received audio signal. Further, the one or more processors 510 are configured to generate an embedding vector representation associated with the received audio signal based on determined acoustic parameters, determined environmental context, or a combination thereof by using an ML-based embedding generator model. The one or more processors 510 are configured to compare the generated embedding vector representation with one or more prestored embedding vector representations. Furthermore, the one or more processors 510 are configured to detect the wakeup command in the received audio signal based on determined environmental context and comparison of the generated embedding vector representation with the one or more prestored embedding vector representations.

In some embodiments of the disclosure, the memory 516 may be communicatively coupled to the one or more processors/controllers 510. The memory 516 may be configured to store data, and instructions executable by the one or more processors/controllers 510. The memory 516 may include, but is not limited to, a non-transitory computer-readable storage media, such as various types of volatile and non-volatile storage media including, but not limited to, a random access memory, a read-only memory, a programmable read-only memory, an electrically programmable read-only memory, an electrically erasable read-only memory, a flash memory, a magnetic tape or disk, an optical media, and the like. In one example, the memory 516 may include a cache or random-access memory for the one or more processors/controllers 510. In alternative examples, the memory 516 be a part of the one or more processors/controllers 510, such as a cache memory of a processor, the system memory, or other memory. In some embodiments of the disclosure, the memory 516 may be an external storage device or database for storing data. The memory 516 may be operable to store instructions executable by the one or more processors/controllers 510. The functions, acts, or tasks illustrated in the figures or described may be performed by the programmed processor/controller for executing the instructions stored in the memory 516. The functions, acts or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

In some embodiments of the disclosure, the plurality of modules 514 may be included within the memory 516. The memory 516 may further include a database 518 to store data. The plurality of modules 514 may include a set of instructions that may be executed to cause the system to perform any one or more of the methods/processes disclosed herein. The plurality of modules 514 may be configured to perform the steps of the disclosure using the data stored in the database 518 for detecting the wakeup command for the voice assistant, as discussed herein. In an embodiment of the disclosure, each of the plurality of modules 514 may be a hardware unit that may be outside the memory 516. Further, the memory 516 may include an operating system 520 for performing one or more tasks of the system 502, as performed by a generic operating system in the communications domain. In one embodiment of the disclosure, the database 518 may be configured to store the information as required by the plurality of modules 514 and the one or more processors/controllers 510 for detecting the wakeup command for the voice assistant.

In an embodiment of the disclosure, at least one of the plurality of modules 514 may be implemented through the ML model. A function associated with the ML may be performed through the non-volatile memory, the volatile memory, and the one or more processors 510.

In an embodiment of the disclosure, the I/O interface 512 may enable input and output to and from the system 502 using suitable devices, such as, but not limited to, a display, a keyboard, a mouse, a touch screen, a microphone, a speaker, and so forth.

Further, the disclosure also contemplates a computer-readable medium that includes instructions or receives and executes instructions responsive to a propagated signal. Further, the instructions may be transmitted or received over the network via a communication port or interface or using a bus (not shown). The communication port or interface may be a part of the one or more processors/controllers 510 or may be a separate component. The communication port may be created in software or may be a physical connection in hardware. The communication port may be configured to connect with a network, external media, the display, or any other components in the UE 504, or combinations thereof. The connection with the network may be a physical connection, such as a wired Ethernet connection, or may be established wirelessly. Likewise, the additional connections with other components of the UE 504 may be physical or may be established wirelessly. The network may alternatively be directly connected to the bus. For the sake of brevity, the architecture and standard operations of the operating system 520, the memory 516, the database 518, the one or more processors/controllers 510, and the I/O interface 512 are not discussed in detail.

Figure 6:
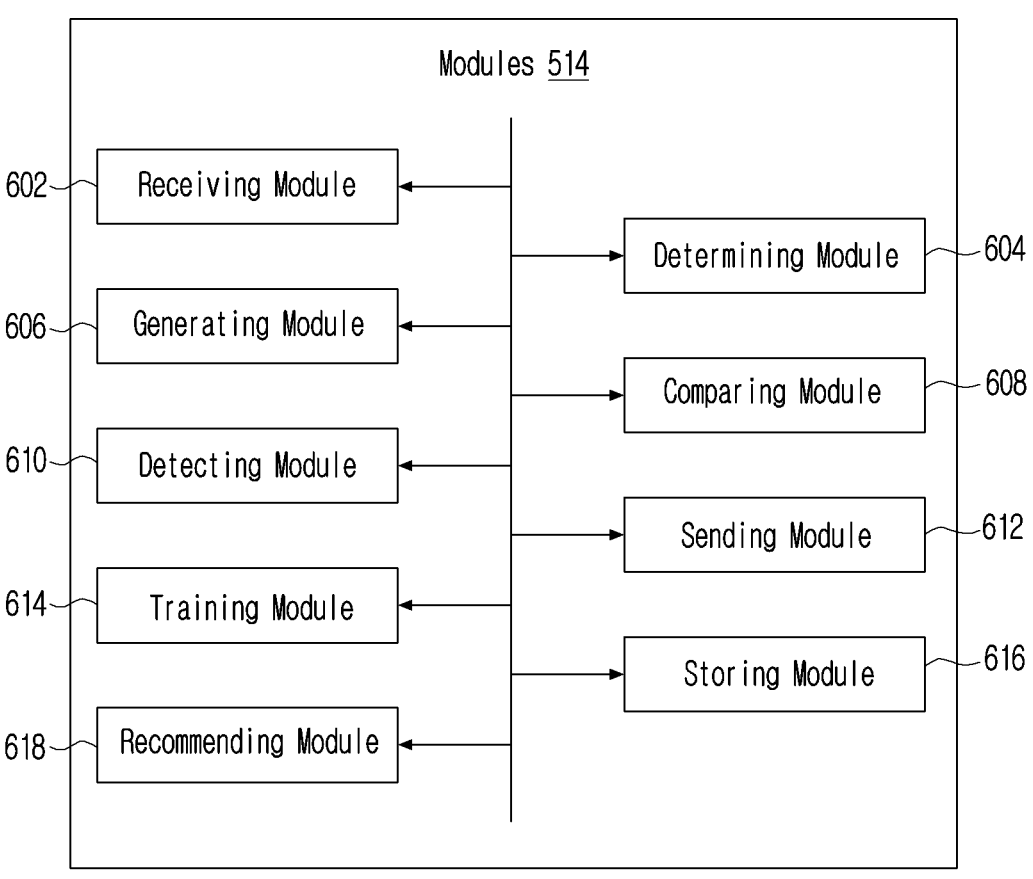
FIG. 6 illustrates a block diagram of a plurality of modules of a system at a user equipment (UE) for detecting a wakeup command for a voice assistant according to an embodiment of the disclosure.

FIG. 6 illustrates a block diagram 600 of plurality of modules of A system at a UE for detecting a wakeup command for a voice assistant according to an embodiment of the disclosure.

Referring to FIG. 6, In an embodiment of the disclosure, the plurality of modules 514 may include, but is not limited to, a receiving module 602, a determining module 604, a generating module 606, a comparing module 608, a detecting module 610, a sending module 612, a training module 614, a storing module 616, and a recommending module 618. The plurality of modules may be implemented by way of suitable hardware and/or software applications.

In an embodiment of the disclosure, the receiving module 602 of the system 502 may be configured to receive the audio signal/acoustic signal from one or more sources. In an embodiment of the disclosure, the one or more sources may include, but not limited to, the user of the UE 504, one or more environmental elements, or a combination thereof. In an embodiment of the disclosure, the audio signal includes a wakeup signal, a noise signal, or a combination thereof. The wakeup signal facilitates the activation of the voice assistant to perform the tasks of the user. Further, the noise signal may refer to unwanted signals which interfere with the wakeup signal to make it difficult for the UE 504 to pick up the wakeup signal for activating the voice assistant. In an embodiment of the disclosure, the noise signal is generated by the one or more environmental elements. For example, the environmental elements correspond to the one or more objects/appliances 506 producing the noise signal. For example, the one or more objects 506 may include a grinder, a television, a radio, a speaker, and the like. Further, the one or more environmental elements also includes the one or more activities occurring in the vicinity of the UE 504. Further examples of the one or more activities may include, but not limited to, people talking, thunder sound, traffic noise, and the like. In another embodiment of the disclosure, the one or more objects 506 may also include an artificial speech equipment capable of producing human voice. For example, the television and the radio may produce one or more human dialogues.

Further, the determining module 604 may be configured to determine the acoustic parameters, the environmental context of the user, or a combination thereof based on the received audio signal. The acoustic parameters associated with the user and/or the environment of the user may include, but not limited to, a pitch, an intensity, a magnitude of the received audio signal, or any combination thereof. Further, the determined environmental context includes information associated with the one or more objects 506 located in the vicinity of the UE 504 and an occurrence of the one or more activities in the vicinity of the UE 504 producing the audio signals. The information includes identification information, location information, and status information. In an embodiment of the disclosure, the identification information includes a type of the one or more objects 506. For example, the type of the one or more objects 506 may be a refrigerator, television, and the like. Further, the status information corresponds to the information associated with a status of the one or more objects 506. In an embodiment of the disclosure, the status of the one or more objects 506 corresponds to ON state and/or OFF state. The location information includes information associated with the location of the one or more objects 506 in the environment of the user. For example, the location information associated with a grinder is that the grinder is located inside the kitchen. In another embodiment of the disclosure, the location of the one or more objects 506 may be defined as a geo-location, a point of interest (POI), an indoor map location, and the like.

Thereafter, the generating module 606 may be configured to generate the embedding vector representation associated with the received audio signal based on the determined acoustic parameters, the determined environmental context, or a combination thereof by using a machine learning (ML)-based embedding generator model. In an embodiment of the disclosure, the ML-based embedding generator model is trained offline and deployed into the UE 504. Thereafter, the ML-based embedding generator model may be fine-tuned by dynamically learning. During training, the ML-based embedding generator model maximizes the gap/margin between each cluster based on the source category of noise.

Furthermore, the comparing module 608 may be configured to compare the generated embedding vector representation with one or more prestored embedding vector representations. In an embodiment of the disclosure, the one or more pre-stored embedding vector representations correspond to vector representations associated with a combination of a set of true wakeups and the one or more environmental contexts of the user, a combination of a set of false wakeups and the one or more environmental contexts of the user, or a combination thereof. The set of true wakeups correspond to the instances where the voice assistant got activated and responded to voice commands without requiring any manual initiation from the user. Further, the set of false wakeups corresponds to the instances where the voice assistant mistakenly activates and responds to a command or query without the user intending to interact with the voice assistant. The false wakeup occurs when the voice assistant misinterprets sounds or words from the environment as the wakeup command, prompting the voice assistant to activate and listen for further instructions or questions.

The detecting module 610 may be configured to detect the wakeup command in the received audio signal based on the determined environmental context and the comparison of the generated embedding vector representation with the one or more pre-stored embedding vector representations. In detecting the wakeup command in the received audio signal, the detecting module 610 may be configured to classify the received audio signal into the true wakeup instance or the false wakeup instance by using a trained ML-based classification model. In an embodiment of the disclosure, the trained ML-based classification model is a light-weight ML or deep learning model which can refer to the filtered embedding vector representations clustered based on the noise sources. In an embodiment of the disclosure, the ML model, such as random forest may be used for performing on-device training. Further, with an increase in margin between the clustered embedding vector representations, on-device classification of the received audio signal into the true wakeup instance or the false wakeup instance may improve. Thus, the accuracy of the wakeup command detection is increase given the noisy environment.

In an embodiment of the disclosure, the sending module 612 is configured to send the one or more prestored embedding vector representations associated with the UE 504 from the UE 504 to the one or more other UEs associated with the user via one or more known techniques. In an embodiment of the disclosure, the one or more other UEs are electronic devices excluding the UE 504 in which the voice assistant is implemented. For example, the one or more other UEs may be a refrigerator, a television, a smartphone, a laptop, and the like. Thus, the one or more other UEs may now detect the wakeup command in the audio signal based on the learnings of the UE. In an embodiment of the disclosure, the one or more techniques may correspond to a wire-based communication technology, a wireless-based communication technology, and the like.

Further, the training module/linker module 614 may be configured to determine, via the voice assistant, an occurrence of a true wakeup instance or a false wakeup instance for the generated embedding vector representation. In determining the occurrence of one of the true wakeup instance or the false wakeup instance, the training module 614 may be configured to receive a set of wake-up commands from the user. The set of wake-up commands may be used to activate the voice assistant on the UE 504 for performing the tasks of the user. For example, the set of wake-up commands may be "wake-up", "Hello", and the like. Further, the training module 614 may be configured to predict a score for each of the set of wake-up commands. The training module 614 may be configured to determine if the predicted score is less than a predefined threshold score. In an embodiment of the disclosure, scores are typically probability values in range of 0.0 to 1.0. The pre-defined threshold of value within this range may determine if the wakeup word may be rejected or accepted. For example, for a threshold of 0.9, any generated prediction score greater than 0.9 will result in wakeup being accepted else rejected. Furthermore, the training module 614 may be configured to reject the set of wake-up commands upon determining that the predicted score is less than the predefined threshold score. The training module 614 may be configured to identify a pattern associated with the prediction of the score and the rejection of the set of wake-up commands based on the generated score and the predefined threshold score. Further, the training module 614 may be configured to determine a number of attempts by the user for waking-up the voice assistant based on the identified pattern.

Thereafter, the training module 614 may be configured to perform a set of acoustic operations on audio signals associated with the received wake-up commands for a predefined time period based on the predicted number of attempts. In an embodiment of the disclosure, the set of acoustic operations includes noise suppression, speech boosting, voice filtering, and the like. Further, the training module 614 may be configured to monitor the identified pattern associated with the prediction of the score to evaluate the audio signals upon performing the set of acoustic operations. In an embodiment of the disclosure, the audio signals are evaluated in time points at which the number of attempts is predicted. The training module 614 may further be configured to determine if a wake-up signal is present in the received set of wake-up commands based on a result of the evaluation of the audio signals by using a signal detection-based ML model. The training module 614 may be configured to generate an embedding vector representation associated with the audio signals upon determining that the wake-up signal is present in the received set of wake-up commands. Furthermore, the training module 614 may be configured to associate the true wakeup instance with the generated embedding vector representation. The training module 614 may be configured to store the generated embedding vector representation in the embedding vector repository upon associating the true wakeup instance with the generated embedding vector representation.

Furthermore, the training module 614 may be configured to associate the determined the true wakeup instance or the false wakeup instance with the generated embedding vector representation, the determined acoustic parameters, and the determined environmental context. The training module 614 may further be configured to store the generated embedding vector representation in an embedding vector repository upon associating the determined one of the true wakeup instance or the false wakeup instance with the generated embedding vector representation, the determined acoustic parameters, and the determined environmental context. The training module 614 may be configured to train the ML-based classification model by using the embedding vector repository upon storing the generated embedding vector representation in the embedding vector repository. Further, Table 2 and Table 3 are the tables generated by the training module 614 based on associating the determined one of the true wakeup instances or the false wakeup instances with the generated embedding vector representation, the determined acoustic parameters, and the determined environmental context. Furthermore, Table 4 shows a sample input stored in the embedding vector repository.

TABLE 2

| Embedding Vector | Natural Label |
|---|---|
| [−0.25, .4, −0.19, .234, . . . , 0.028] | True Wakeup |
| [−0.25, .4, −0.19, .234, . . . , 0.028] | False Wakeup |

TABLE 3

| Location | Noisy Targets |
|---|---|
| Home Kitchen | Microwave, Mixer, Fridge, Chimney, etc |
| Home Living Room | TV, Radio, Speaker, etc |

TABLE 4

| Embedding Vector | Natural Label | Noisy Source | Location |
|---|---|---|---|
| [−0.25, .4, −0.19, .234, . . . , 0.028] | True Wakeup | Mixer | Home Kitchen |
| [−0.25, .4, −0.19, .234, . . . , 0.028] | False Wakeup | TV, Speaker | Home Living Room |

In an embodiment of the disclosure, the storing module 616 may be configured to determine that the voice assistant is unable to obtain the natural label for the generated embedding vector representation of the audio signal. Further, the storing module 616 may be configured to generate a score for the wakeup command in the audio signal based on a number of wakeup attempts, the embedding vector representation, the acoustic parameters, and the environmental context of the user. The storing module 616 may further be configured to associate the generated score with the embedding vector representation, the wakeup command, the acoustic parameters, and the environmental context. Furthermore, the storing module 616 may be configured to store the generated embedding vector representation in the embedding vector repository upon associating the generated score with the embedding vector representation, the wakeup command, the acoustic parameters, and the environmental context.

Further, the recommending module 618 may be configured to determine that the voice assistant is unable to determine the occurrence of the true wakeup instance or the false wakeup instance for the embedding vector representation of the audio signal. The recommending module 618 may be further configured to obtain an alternate wakeup command from the embedding vector repository based on the embedding vector representation, the acoustic parameters, the environmental context associated with the audio signal and the generated score. The recommending module 618 may be configured to recommend the obtained alternate wakeup command to the user via one or more modes. For example, when the user used "wake-up" phrase as the wake-up command and the voice assistant fails to determine the occurrence of the true wakeup instance or the false wakeup instance, the user may use "hello there" phrase in place of the "wake-up" phrase as the alternate wake-up command. In an embodiment of the disclosure, the one or more modes may correspond to displaying the alternate wakeup command on a user interface screen of the UE, outputting the alternate wakeup command in the form of voice prompts, and the like. Further, the details on recommending the alternate wakeup command to the user have been elaborated in subsequent paragraphs of the present description at least with reference to FIGS. 13 and 14.

Figure 7:
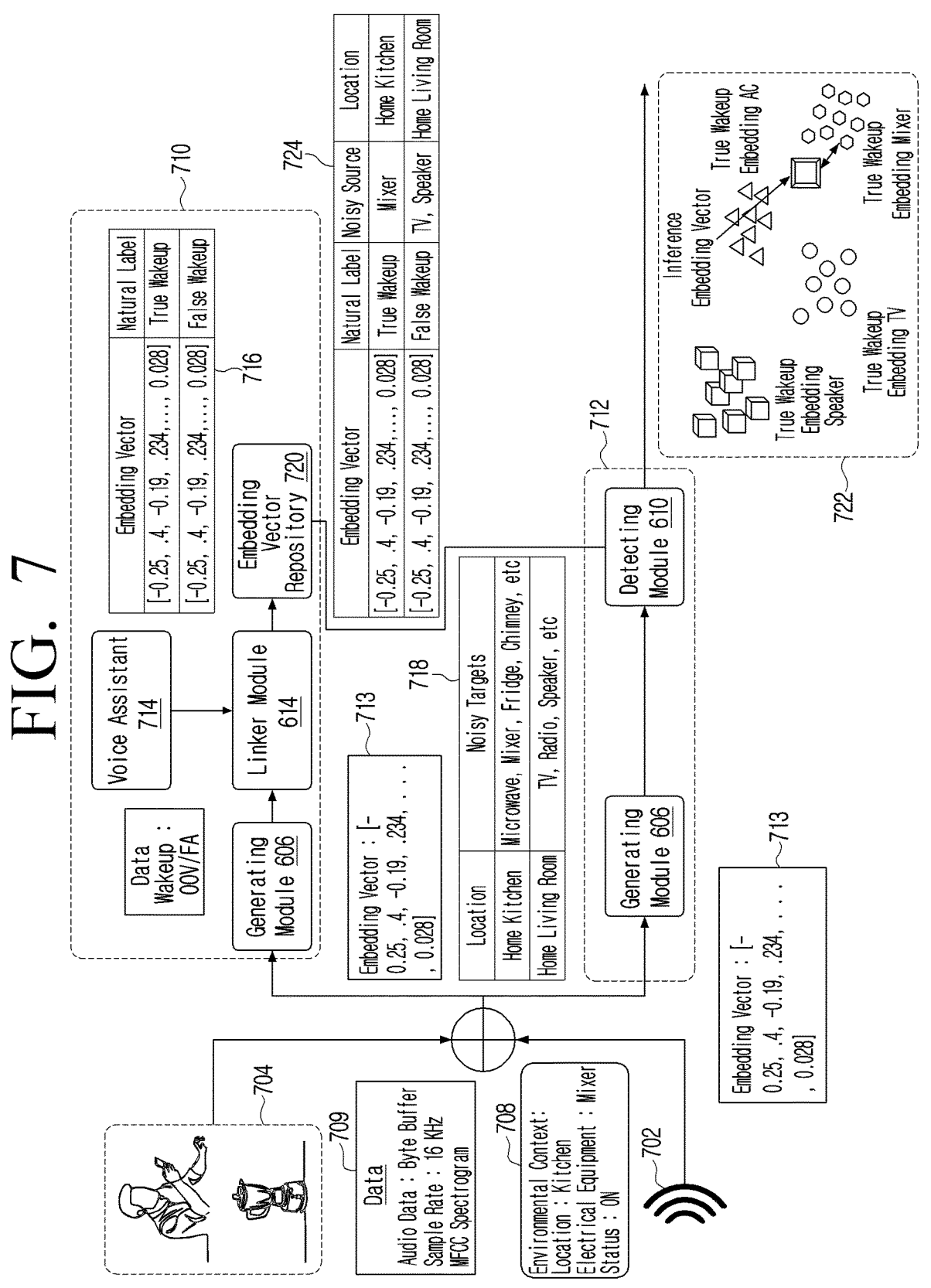
FIG. 7 illustrates a block diagram depicting an operation of a system for detecting a wakeup command for a voice assistant according to an embodiment of the disclosure.

Further, the details on the operation of the system 502 have been elaborated in subsequent paragraphs of the present description at least with reference to FIGS. 7 and 8. Furthermore, the details on use-case scenarios of the system 502 have been elaborated in subsequent paragraphs of the present description at least with reference to FIGS. 9 to 13.

FIG. 7 illustrates a block diagram depicting an operation of a system for detecting a wakeup command for a voice assistant according to an embodiment of the disclosure.

FIG. 8 illustrates a block diagram depicting an operation of a system for detecting a wakeup command for a voice assistant according to an embodiment of the disclosure. For the sake of brevity, the FIGS. 7 and 8 are explained together. The system 502 for detecting the wakeup command for the voice assistant is described with reference to FIGS. 5 and 6.

Referring to FIGS. 7 and 8, as depicted, 702 represents a speech signal (i.e., a true-wakeup signal produced by the user or a false wake-up signal produced by the artificial speech equipment). Further, 704 represents a noise signal generated from the one or more environmental elements. In an embodiment of the disclosure, the audio/acoustic signal 706 representing a superimposed speech signal and environment noise is inputted into the system 502. As depicted, 708 represents the environmental context including the information associated with the one or more objects 506 located in the vicinity of the UE 504 and the occurrence of the one or more activities in the vicinity of the UE 504 producing the audio signals. In an embodiment of the disclosure, the environmental context 708 may be that the electrical equipment producing the noise may be a mixer, the location of the electrical equipment may be a kitchen, and the status of the electrical equipment is ON. In an embodiment of the disclosure, data 709 is associated with the noise signal 704, and the acoustic signal 706 corresponds to audio data and sample rate. For example, the audio data may be a byte buffer and a sample rate may be 16 KHz Mel-frequency cepstral coefficients (MFCC) spectrogram.

Further, 710 represents a learning pipeline of the system 502. 712 represents an inference pipeline of the system 502. The generating module 606 generates the embedding vector representation 713 for the received audio signal associated with the speech and the environmental noise. In an embodiment of the disclosure, the speech may be related to the user or the artificial speech equipment. Further, the voice assistant 714 is used to determine the true wakeup instance or the false wakeup instance for the generated embedding vector representation. The voice assistant 714 uses out of vocabulary (OOV) and false alarm (FA). In an embodiment of the disclosure, the OOV correspond to all kinds of acoustics which are different from the true wakeup. In an embodiment of the disclosure, the FA correspond to acoustic word which are similar sounding as true alarm case. Furthermore, a linker module/training module 614 removes the noise from the audio signal and associates the determined true wakeup instance or the determined false wakeup instance with the generated embedding vector representation, the acoustic parameters, and the environmental context 708. Further, Table 716 represents a table with location and noisy target and Table 718 represents a table with embedding vector and a type of the wake-up instance (natural label, as shown). These tables are generated by the linker module 614. Further, the linker module 614 stores the generated embedding vector representation in the embedding vector repository

720 upon associating the determined true wakeup instance or the determined false wakeup instance with the generated embedding vector representation, the acoustic parameters, and the environmental context 708. In an embodiment of the disclosure, the one or more prestored embedding vector representations stored in the embedding vector repository 720 is represented by 722. The determined true wakeup instance or the determined false wakeup instance associated with the generated embedding vector representation, the acoustic parameters, and the environmental context is represented by 724.

Furthermore, in the inference pipeline 712, the generating module 606 generates the embedding vector representation associated with the audio signal based on the acoustic parameters, the environmental context, or a combination thereof. The detecting module 610 classifies the received audio signal into a wake-up decision 725 i.e., the true wakeup instance or the false wakeup instance, by using the trained ML-based classification model.

In an embodiment of the disclosure, a wake-up recommender 726 is used to determine alternative wakeup words 728 which have more chance to activate the voice assistant as compared to an existing wakeup word. Details on the operation of the alternate wake-up word are provided with reference to at least FIGS. 14 and 15.

Figure 9:
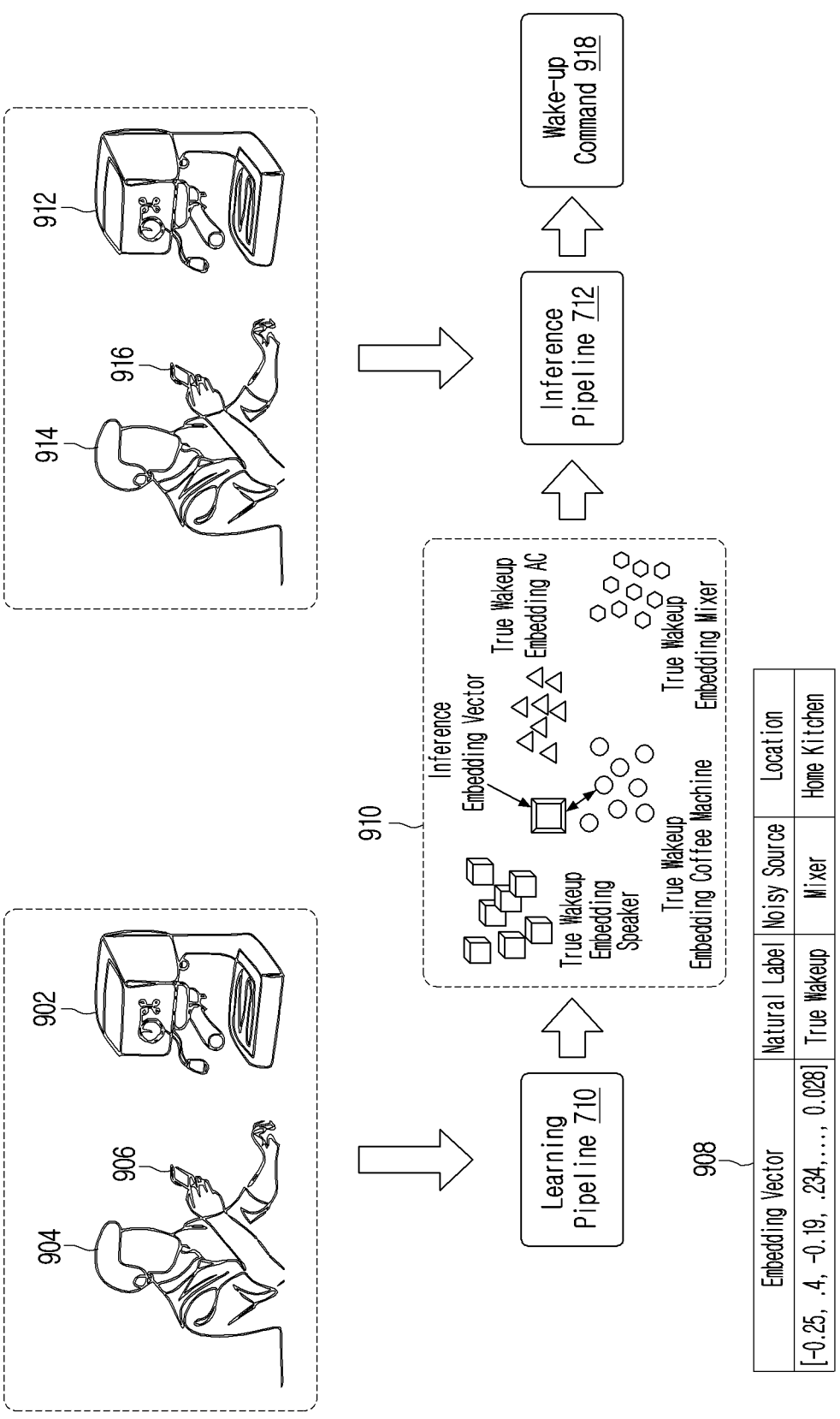
FIG. 9 illustrates a pictorial depiction representing a scenario for detecting a wake-up command in a noisy environment according to an embodiment of the disclosure.

FIG. 9 illustrates a pictorial depiction representing a scenario for detecting a wake-up command in a noisy environment according to an embodiment of the disclosure. The system 502 for detecting the wakeup command for the voice assistant is described with reference to FIGS. 5 and 6.

Referring to FIG. 9, as depicted, 902 corresponds to a coffee machine is running producing noise in the environment of the user. 904 corresponds to the user providing the wake-up command to the voice assistant for listening to the latest news. Further, at 906, the voice assistant failed to recognize the wake-up command due to the noise in the environment caused by the coffee machine. Further, the system 502 performs multiple processes in the learning pipeline 710, as explained with reference to FIG. 7. For example, multiple processes in the learning pipeline may include generating the embedding vector representation, associating the true wakeup instance or the false wakeup instance with the embedding vector representation and the environmental context, and storing the embedding vector representation, a type of wakeup instance (i.e., the true wakeup instance or the false wakeup instance), the environmental context, and the like in the embedding vector repository in the form of a table as depicted by 908. In the current scenario, the environmental context includes electrical equipment is a coffee machine, location is the kitchen, and status is on. The embedding vector repository includes the one or more prestored embedding vector representations 910, such as true wakeup embedding for speaker, true wakeup embedding for coffee machine, true wakeup embedding for air conditioner, true wakeup embedding for mixer, and the like.

Further, 912 corresponds to the coffee machine producing noise in the environment of the user. 914 corresponds to the user who provides the wake-up command to the voice assistant for reading the latest news. Further, 916 corresponds to the voice assistant. The voice assistant successfully recognizes the wake-up command into a wake-up decision 918 in the noisy environment by performing the multiple processes in the inference pipeline 712, as explained with reference to FIG. 7.

Figure 10:
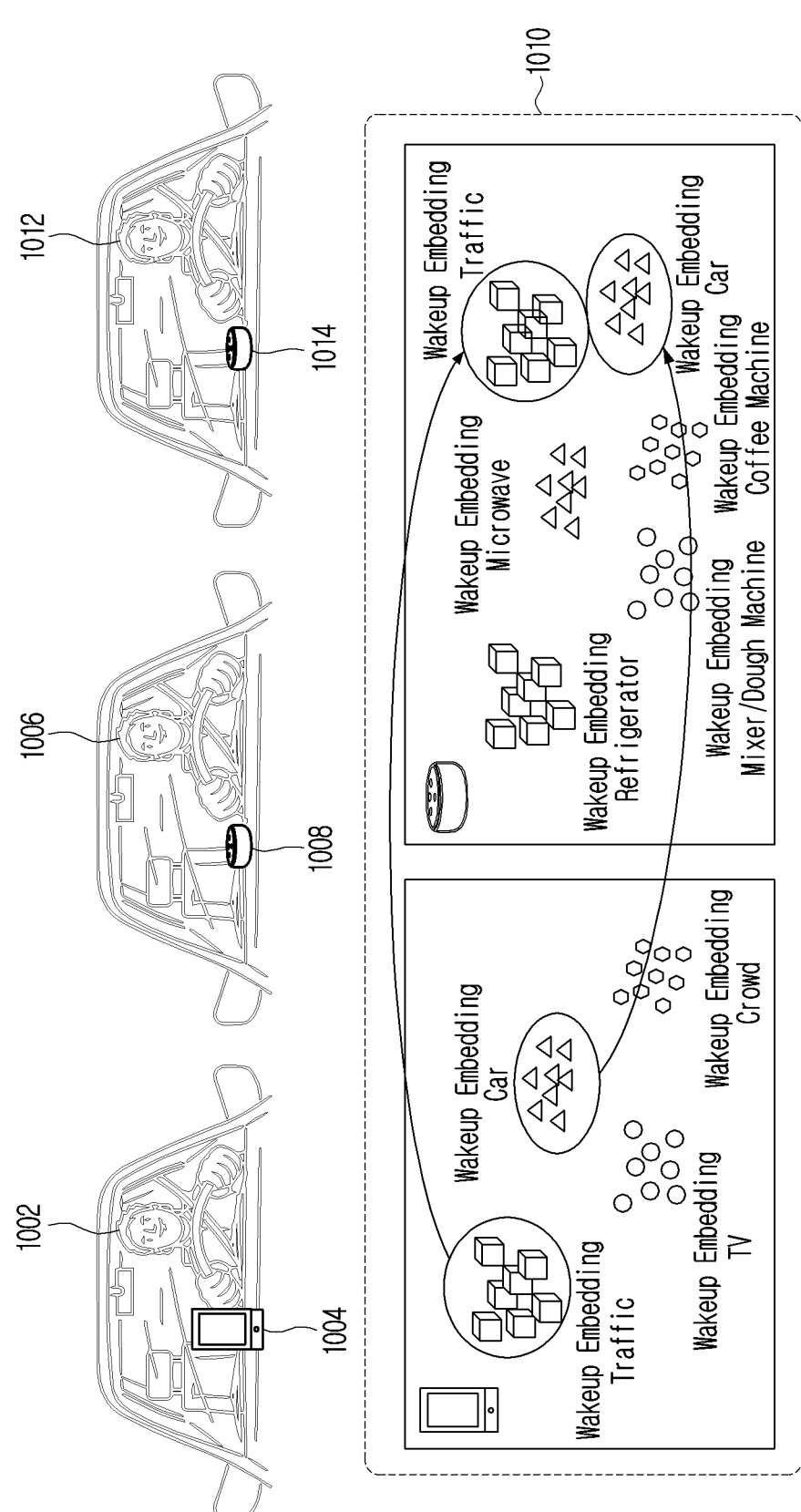
FIG. 10 illustrates a pictorial depiction representing a scenario for sending one or more prestored embedding vector representations from a UE to one or more other UEs according to an embodiment of the disclosure.

FIG. 10 illustrates a pictorial depiction representing a scenario for sending one or more prestored embedding vector representations from a UE to one or more other UEs according to an embodiment of the disclosure.

The system 502 for sending the one or more prestored embedding vector representations from the UE 504 to the one or more other UEs is described with reference to FIGS. 5 and 6.

In the current scenario, the user drives a car along with a smart phone. The smart phone has learned robust wakeup detection while in the traffic. For a picnic plan, the user carried a speaker with him in the car. In peak traffic, the user interacts with the speaker trying to wakeup the voice assistant in the speaker. However, the speaker fails to recognize the true intended wakeup signal.

Referring to FIG. 10, 1002 corresponds to the user. The user provides the wake-up command to the smartphone for viewing an alternate route to home. 1004 corresponds to the voice assistant on the smartphone. The voice assistant searched the alternate route and displayed it to the user based on the learning performed by the smartphone for wakeup recognition in the traffic over a period of time.

Further, 1006 corresponds to the user. The user provides the wake-up command to the speaker for viewing the alternate route to the home. 1008 corresponds to the voice assistant on the speaker. The voice assistant failed to recognize the intended wakeup signal in the traffic noise even when the smartphone has learned it over a period of time. Further, the system 502 performs the transfer of learned embedding vector representations from the smartphone to the speaker based on contextual needs, as depicted by 1010. In an embodiment of the disclosure, the contextual needs correspond to contextual adaptation. The UE in traffic is required to adapt wakeup detection in traffic environment. For this, the embeddings are required to be transferred to other UE devices.

Furthermore, 1012 corresponds to the user. The user again provides the wake-up command to the speaker for viewing the alternate route to the home. Further, 1014 corresponds to the speaker. The speaker recognizes the wakeup signal in the traffic noise upon transferring the learned embedding vector representations from the smartphone to the speaker.

In another scenario, multiple UEs are configured for the same user account. In the next step, the acoustic parameters are generated along with the environment context for each of the multiple UEs. In the next step, the embedding vector representation for each of the multiple UEs is stored in the embedding vector repository, categorized by the environment context. Further, the embedding vector representations are uploaded to a common server for aggregation. In the next step, the aggregated embedding vector representation is downloaded into a device repository of each of the multiple UEs. Thus, the multiple UEs can use the learned embedding vector representations of each other.

Figure 11:
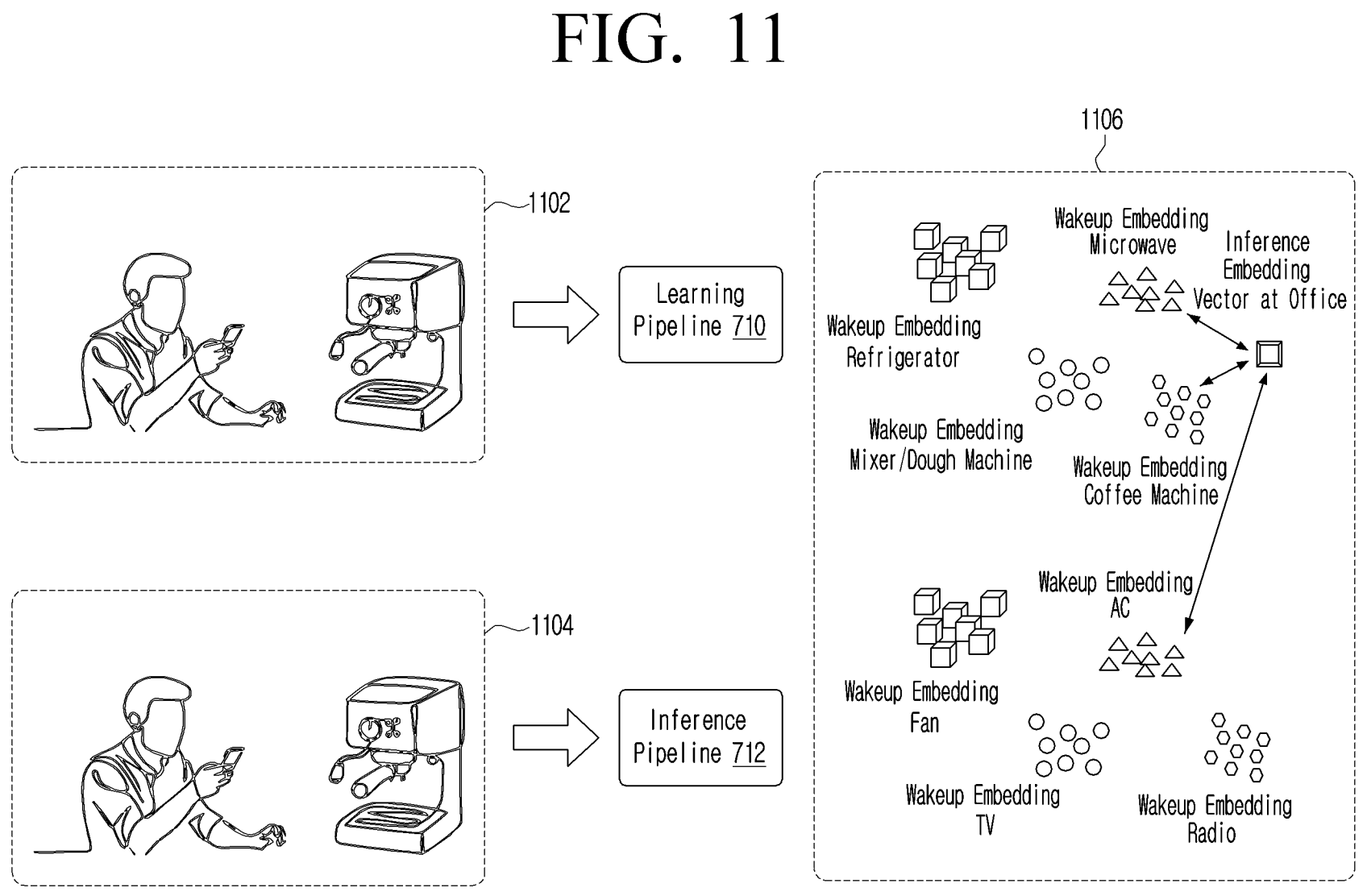

FIG. 11 illustrates a pictorial depiction representing a scenario for using one or more prestored embedding vector representations at different locations according to an embodiment of the disclosure.

The system 502 for detecting the wakeup command for the voice assistant is described with reference to FIGS. 5 and 6. FIG. 11 depicts the use of the one or more prestored embedding vector representations at different locations for detecting the wakeup command for the voice assistant.

Referring to FIG. 11, in the current scenario, the coffee machine is located in a home kitchen of the user. At operation 1102, the system 502 receives a true wakeup signal at the home while the coffee machine is turned ON.

Further, the system 502 performs the multiple processes of the learning pipeline 710 for learning the wakeup detection with the coffee machine noise at the home based on the environment context. In the current scenario, the environmental context may include that the electrical equipment is the coffee machine, the location of the electrical equipment is the kitchen, and the status is ON.

At operation 1104, the system 502 receives the true wakeup signal at the office of the user while the coffee machine is turned ON. Further, the system 502 performs the multiple processes of the inference pipeline 712 based on the result of learning the wakeup detection with the coffee machine noise at the home. The multiple processes of the inference pipeline are performed based on the environmental context of the user. In the current scenario, the environmental context may include that the electrical equipment is the coffee machine, the location of the electrical equipment is the office pantry, and the status is ON. Furthermore, 1106 represents the one or more prestored embedding vector representations along with the inference embedding vector at the office.

Figure 12:
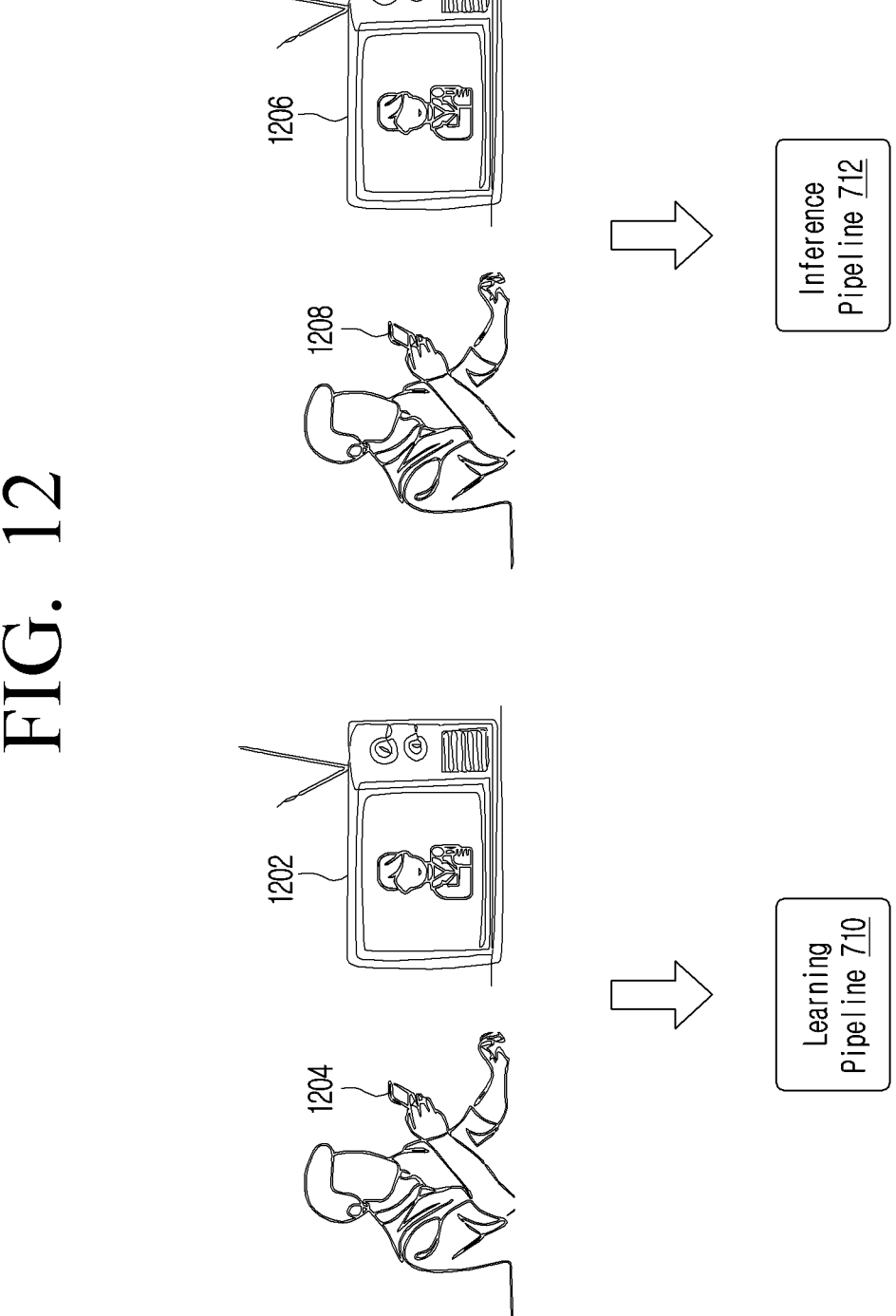
FIG. 12 illustrates a pictorial depiction representing a scenario for detecting a false wake-up according to an embodiment of the disclosure.

FIG. 12 illustrates a pictorial depiction representing a scenario for detecting a false wake-up according to an embodiment of the disclosure.

The system 502 for detecting the false wake-up is described with reference to FIG. 6.

Referring to FIG. 12, in the current scenario, the user is watching a television program where a show host speaks about the voice assistant. The show host speaks out about the voice assistant multiple times during his speech. This causes the voice assistant in the user's smartphone to wakeup several times. 1202 represents the television. The host in the television is speaking about the voice assistant i.e., "voice assistant is a very powerful tool". At operation 1204 represents the voice assistant. The voice assistant gets activated and responds "I didn't understand that". Further, the system 502 performs the multiple processes in the learning pipeline 710 based on the environmental context of the user, as explained with reference to FIG. 7. In the current scenario, the environmental context may include that the electrical equipment is the television, the location of the electrical equipment is a living room, and the status is ON.

Further, 1206 depicts that the host on the television is speaking about the voice assistant i.e., "voice assistant is a very powerful tool". 1208 depicts that the voice assistant no longer wakes up to false wakeups triggered by the TV speaker by performing the multiple processes of the inference pipeline 712 based on the environmental context. Thus, the system 502 learns the false wakeup using the environmental context and hence forth rejects similar wakeup acoustic signals.

Figure 13:
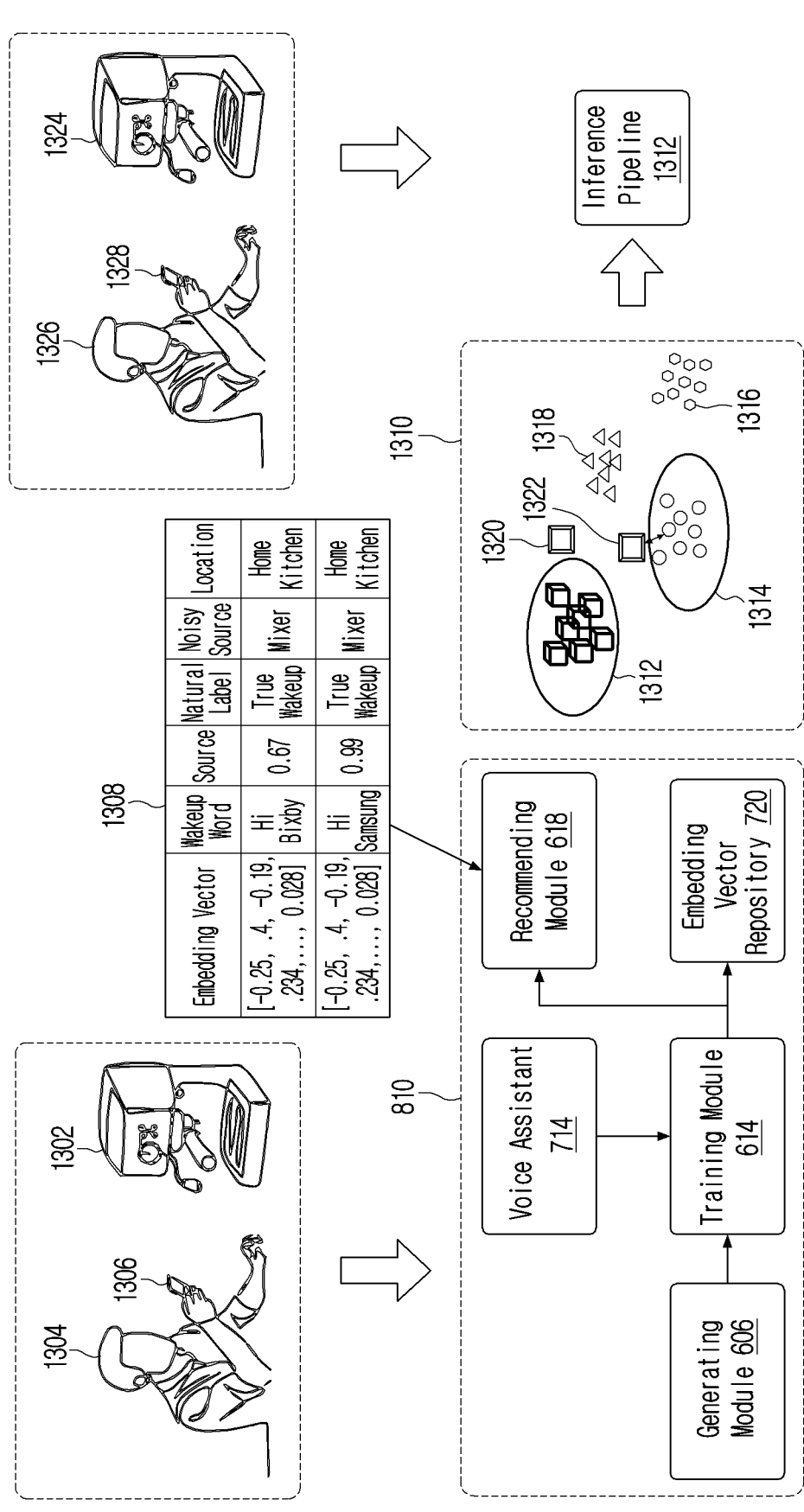
FIG. 13 illustrates a pictorial depiction representing a scenario for recommending an alternate wakeup word according to an embodiment of the disclosure.

FIG. 13 illustrates a pictorial depiction representing a scenario for recommending an alternate wakeup word according to an embodiment of the disclosure.

The system 502 for recommending the alternate wakeup word is described with reference to FIG. 6.

In the current scenario, the user is in the home kitchen where one or more electrical appliances, such as a coffee machine, a mixer, and the like, are turned on. In such a noisy situation, the user attempted to initiate a voice interaction with the voice assistant. Due to environmental noise, the voice assistant failed to recognize the wakeup signal as it rejected the request of the voice interaction. In an embodiment of the disclosure, the system rejects the request of the user due to one or more reasons, such as an automatic speech recognition module of the voice assistant failing to generate speech-to-text, a natural language understanding module of the voice assistant rejected an invalid utterance, and partial information in the voice assistant response. The system 502 detects successive attempts and recommends alternative wakeup words to activate the voice assistant.

Referring to FIG. 13, as depicted, 1302 depicts that a coffee machine is running and producing noise in the environment of the user. 1304 represents the user. The user provides a wake-up command to the voice assistant for listening to the latest news. For example, the wake-up command is "hey voice assistant". Further, 1306 represents the voice assistant. The voice assistant failed to recognize the wake-up command for successive attempts due to the noise in the environment caused by the coffee machine. Further, the system 502 performs multiple processes in the learning pipeline 710, as explained with reference to FIG. 7. In the current scenario, the system 502 detects successive attempts of the user to activate the voice assistant and recommends alternative wakeup words that may work based on the environment context, by using the recommending module 618. In the current scenario, the environmental context includes electrical equipment is the coffee machine, the location is the kitchen, and the status is on. In an embodiment of the disclosure, the recommending module 618 of the learning pipeline generates a table 1308 including the embedding vector representations, wake-up words, a score associated with each of the wake-up words, a type of the wake-up instance, noisy source, location, and the like. Further, 1310 represents clusters matching the environment context. In the clusters matching environment context, the system 502 obtains the alternate wakeup command from the embedding vector repository. The embedding vector repository includes multiple vector representations corresponding to the wake-up word and the environmental context. For example, the multiple vector representations include "hey voice assistant embedding coffee machine" 1312, "hello voice assistant embedding coffee machine" 1314, "hey voice assistant embedding mixer" 1316, and "hey fold embedding AC" 1318.

In obtaining the alternate wakeup command from the embedding vector repository, the system 502 determines successive failed true wakeup attempts. Further, the system 502 determines if the number of successive failed true wakeup attempts exceeds a predetermined threshold. The system 502 identifies the one or more vector possible representations from the multiple vector representations upon determining that the number of successive failed true wakeup attempts exceeds the predetermined threshold. Finally, the system 502 identifies a vector representation from the one or more vector representations and recommends the alternate wakeup word associated with the identified vector representation. In an embodiment of the disclosure, the alternate wakeup word comes from clusters that are related completely or partially to the environment context. For example, the alternate wakeup command may be "hello voice assistant". 1320 represents "hey voice assistant" reference vector; failed attempts which are located away from "hey voice assistant" keyword. 1322 represents the inference embedding vector.

Further, 1324 depicts that the coffee machine is running producing noise in the environment of the user. 1326 represents that the user provides the alternate wake-up command to the voice assistant for reading the latest news. Further, 1328 represents that the voice assistant successfully recognizes the wake-up command in the noisy environment by performing the multiple processes in the inference pipeline 712, as explained with reference to FIG. 7.

In another embodiment of the disclosure, the user may also manually set one or more alternate wake-up word for a particular wake-up word, such that the user may use the one or more alternate wake-up word for activating the voice assistant in case the previously used wake-up word is not working. Further, the system eliminates information associated with the previously used wakeup word from the embedding vector repository. Further, the one or more alternate wakeup word is stored in the embedding vector repository to model a new custom wakeup model for recognizing the wake-up word. The custom wakeup model is generated using the acoustic signals from each user's wakeup command recorded during interactions with the virtual assistants. Such acoustic signals are accumulated over a period of usage and interaction with the virtual assistant and are representational of a wide range of vocabulary. An acoustic signal corresponding to a custom wakeup word matching with the vocabulary list may be used for building the custom wakeup model.

FIG. 14 illustrates a process flow diagram for recommending an alternate wakeup word according to an embodiment of the disclosure.

The system 502 for recommending the alternate wakeup word is described with reference to FIGS. 6 and 13.

Referring to FIG. 14, at operation 1402, the system 502 receives the set of wake-up commands in the noisy environment from the user and predicts a score for each of the set of wake-up commands. The system 502 determines if the predicted score is less than the predefined threshold score. Further, at operation 1404, the system 502 rejects the set of wake-up commands upon determining that the predicted score is less than the predefined threshold score. Furthermore, at operation 1406, the system 502 identifies a pattern associated with the prediction of the score and the rejection of the set of wake-up commands based on the generated score and the predefined threshold score. At operation 1408, the system 502 determines the number of attempts by the user for waking-up the voice assistant based on the identified pattern.

At operation 1410, the system 502 performs the set of acoustic operations on audio signals associated with the received wake-up commands for a predefined time period based on the predicted number of attempts. At operation 1412, the system 502 monitors the identified pattern associated with the prediction of the score to evaluate the audio signals upon performing the set of acoustic operations. The audio signals are evaluated in time points at which the number of attempts are predicted. At operation 1414, the system 502 determines if a wake-up signal is present in the received set of wake-up commands based on a result of evaluation of the audio signals by using a signal detection-based ML model. In an embodiment of the disclosure, the system 502 uses the time-sliced audio signals to determine the presence of the wakeup signal. In an embodiment of the disclosure, the signal detection-based ML model is a deep neural network (DNN) model which is accurate and resource-consuming. At operation 1416, the system 502 generates the embedding vector representation by using the time sliced raw audio signal without acoustic synthesis upon determining that the wake-up signal is present in the received set of wake-up commands. The embedding vector representation is stored in the embedding vector repository for matching against upcoming attempts. Further, at operation 1416, the system 502 recommends alternative wakeup words which have more chance to activate the voice assistant as compared to an existing wakeup word. At operation 1418, the system 502 resumes to its default operation for monitoring the wakeup word in case no valid wakeups are detected.

Figure 15:
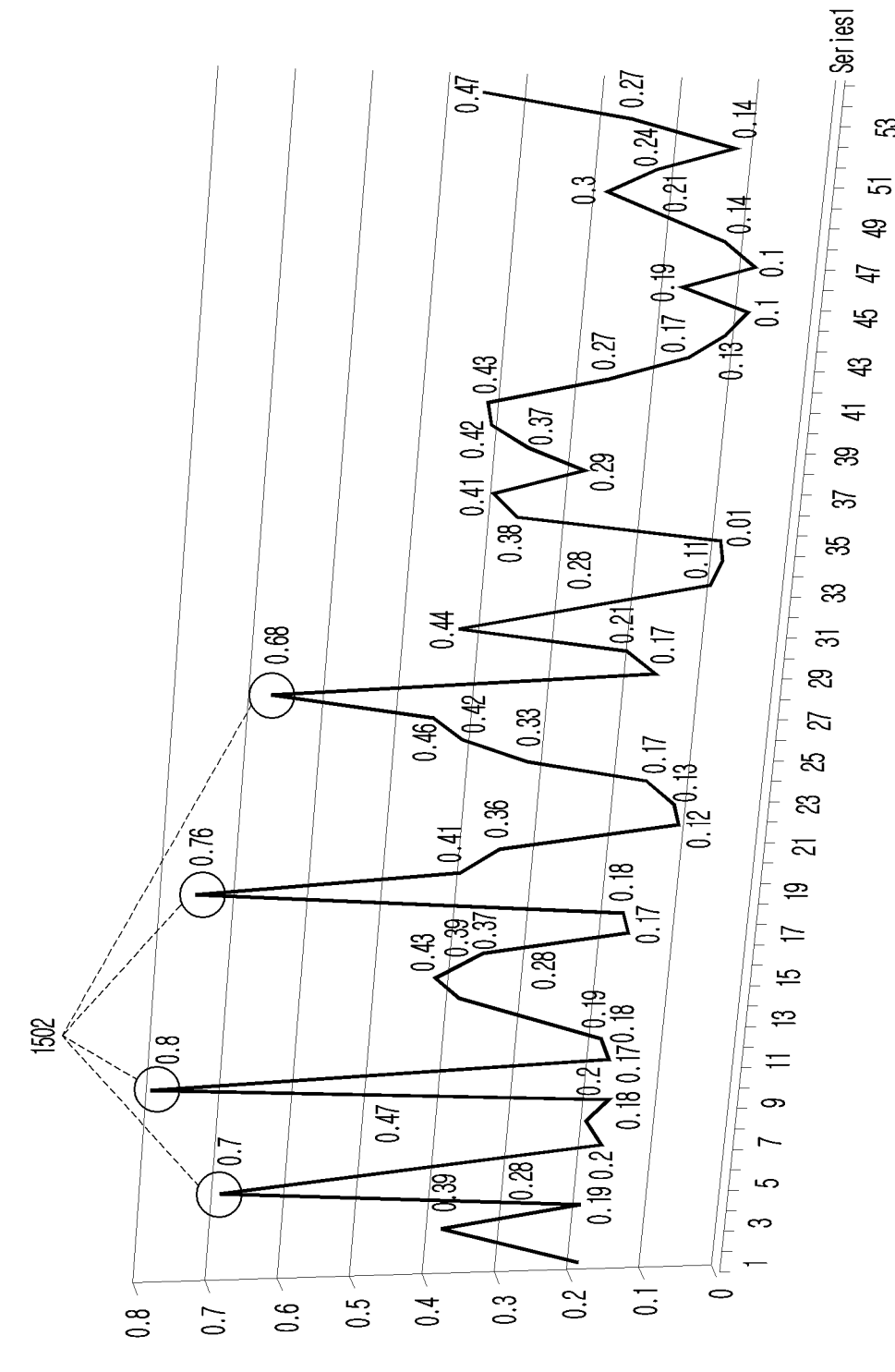
FIG. 15 illustrates a graph for depicting trends in predicted scores associated with each of a set of wake-up commands according to an embodiment of the disclosure.

FIG. 15 illustrates a graph for depicting trends in predicted scores associated with each of a set of wake-up commands according to an embodiment of the disclosure.

The details on predicting the scores associated with each of the set of wake-up commands are described with reference to FIGS. 6 and 14. FIG. 15 depicts the trends in prediction scores.

Referring to FIG. 15, as depicted, 1502 represents wake-up attempts by the user. In an embodiment of the disclosure, the true wakeup threshold is 0.9.

FIG. 16 illustrates a process flow depicting a method for detecting a wakeup command for a voice assistant according to an embodiment of the disclosure.

Referring to FIG. 16, a method 1600 may be performed by a system 502 implemented in user equipment (UE) 504, as shown in FIG. 5.

At operation 1602, the method 1600 includes receiving an audio signal from one or more sources. In an embodiment of the disclosure, the one or more sources include a user of the UE 504, one or more environmental elements, or a combination thereof. The audio signal includes a wakeup signal, a noise signal, or a combination thereof. In an embodiment of the disclosure, the noise signal is generated by the one or more environmental elements.

At operation 1604, the method 1600 includes determining acoustic parameters, an environmental context of the user, or a combination thereof based on the received audio signal. In an embodiment of the disclosure, the acoustic parameters associated with the user and the environment of the user include a pitch, an intensity, a magnitude of the received audio signal, or any combination thereof. In an embodiment of the disclosure, the determined environmental context includes information associated with one or more objects located in vicinity of the UE and an occurrence of one or more activities in the vicinity of the UE producing the audio signals. For example, the information includes identification information, location information, and status information.

At operation 1606, the method 1600 includes generating an embedding vector representation associated with the received audio signal based on the determined acoustic parameters, the determined environmental context, or a combination thereof by using a machine learning (ML)-based embedding generator model.

At operation 1608, the method 1600 includes comparing the generated embedding vector representation with one or more prestored embedding vector representations. In an embodiment of the disclosure, the one or more pre-stored embedding vector representations correspond to vector representations associated with a combination of a set of true wakeups and one or more environmental contexts of the user, a combination of a set of false wakeups and the one or more environmental contexts of the user, or a combination thereof.

At operation 1610, the method 1600 includes detecting the wakeup command in the received audio signal based on the determined environmental context and the comparison of the generated embedding vector representation with the one or more pre-stored embedding vector representations. In detecting the wakeup command in the received audio signal, the method 1600 includes classifying the received audio signal into a true wakeup instance or a false wakeup instance by using a trained machine learning (ML)-based classification model.

In an embodiment of the disclosure, the method 1600 includes sending the one or more prestored embedding vector representations associated with the UE from the UE to one or more other UEs associated with the user via one or more techniques.

Further, the method 1600 includes determining, via the voice assistant, an occurrence a true wakeup instance or a false wakeup instance for the generated embedding vector representation. In determining the occurrence of the true wakeup instance or the false wakeup instance, the method 1600 includes receiving a set of wake-up commands from the user. The method 1600 also includes predicting a score for each of the set of wake-up commands. Furthermore, the method 1600 includes determining if the predicted score is less than a predefined threshold score. The method 1600 includes rejecting the set of wake-up commands upon determining that the predicted score is less than the predefined threshold score. The method 1600 also includes identifying a pattern associated with the prediction of the score and the rejection of the set of wake-up commands based on the generated score and the predefined threshold score. Furthermore, the method 1600 includes determining a number of attempts by the user for waking-up the voice assistant based on the identified pattern.

Further, the method 1600 includes performing a set of acoustic operations on audio signals associated with the received wake-up commands for a predefined time period based on the predicted number of attempts. In an embodiment of the disclosure, the set of acoustic operations include noise suppression, speech boosting, and voice filtering. The method 1600 includes monitoring the identified pattern associated with the prediction of the score to evaluate the audio signals upon performing the set of acoustic operations. The audio signals are evaluated in time points at which the number of attempts are predicted. The method 1600 includes determining if a wake-up signal is present in the received set of wake-up commands based on a result of evaluation of the audio signals by using a signal detection-based ML model. Furthermore, the method 1600 includes generating an embedding vector representation associated with the audio signals upon determining that the wake-up signal is present in the received set of wake-up commands. The method 1600 includes associating the true wakeup instance with the generated embedding vector representation. Further, the method 1600 includes storing the generated embedding vector representation in the embedding vector repository upon associating the true wakeup instance with the generated embedding vector representation.

Furthermore, the method 1600 includes associating the determined true wakeup instance or the determined false wakeup instance with the generated embedding vector representation, the determined acoustic parameters, and the determined environmental context. The method 1600 includes storing the generated embedding vector representation in an embedding vector repository upon associating the determined one of the true wakeup instance or the false wakeup instance with the generated embedding vector representation, the determined acoustic parameters, and the determined environmental context. The method 1600 also includes training an ML-based classification model by using the embedding vector repository upon storing the generated embedding vector representation in the embedding vector repository.

The method 1600 includes determining that the voice assistant is unable to obtain the natural label for the generated embedding vector representation of the audio signal. Further, the method 1600 includes generating a score for the wakeup command in the audio signal based on a number of wakeup attempts, the embedding vector representation, the acoustic parameters, and the environmental context of the user. The method 1600 includes associating the generated score with the embedding vector representation, the wakeup command, the acoustic parameters, and the environmental context. Furthermore, the method 1600 includes storing the generated embedding vector representation in the embedding vector repository upon associating the generated score with the embedding vector representation, the wakeup command, the acoustic parameters, and the environmental context.

Further, the method 1600 includes determining that the voice assistant is unable to determine the occurrence of the true wakeup instance or the false wakeup instance for the embedding vector representation of the audio signal. The method 1600 includes obtaining an alternate wakeup command from the embedding vector repository based on the embedding vector representation, the acoustic parameters, the environmental context associated with the audio signal and the generated score. The method 1600 also includes recommending the obtained alternate wakeup command to the user via one or more modes.

While the above steps shown in FIG. 16 are described in a particular sequence, the steps may occur in variations to the sequence in accordance with various embodiments of the disclosure. Further, the details related to various steps of FIG. 16, which are already covered in the description related to FIGS. 6 to 15 are not discussed again here for the sake of brevity.

The disclosure provides for various technical advancements based on the key features discussed above. Further, the disclosure detects the wakeup command in the noisy environment by using the environmental context. The disclosure improves wakeup recognition in different environmental contexts over a period of time. Moreover, the learnings from one device in one context can be applied to another device in a similar or same context. Further, the disclosure also improves the rejection of false wakeup detection and reduces the number of false wakeups on-device side. Thereby reducing the load on server automatic speech recognition (ASR) models to determine the wakeup event. The system learns from the user's voice without the need to explicitly route the user through an enrolment process. Further, the embedding vector repository indicates true/false wake-up events in different environmental contexts. The embedding vector repository is used to improve the accuracy of the wake-up recognition. The system reduces the number of false negative cases i.e., the cases where the user spoke the wake-up command, but the system failed to recognize the wake-up word. Further, the disclosure also transfers wakeup improvement learnings from one device to another device. With time, the size of the embedding vector repository increases. Over the period of time, the embeddings learnt from user's wakeup triggers may be used to personalize the model. This way, the model may be more used by the user for invoking the wakeup in a user specific environment. For example, if user the uses wakeup triggers mostly in kitchen, then the system may adapt to the wakeup triggers from the kitchen. The system facilitates custom wakeup recognition by using the environmental context.

The plurality of modules 514 may be implemented by any suitable hardware and/or set of instructions. Further, the embodiments may include addition/omission of steps as per the requirement. In some embodiments of the disclosure, the one or more operations performed by the plurality of modules 514 may be performed by the processor/controller based on the requirement.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for detecting a wakeup command for a voice assistant implemented in a user equipment (UE), the method comprising:
   receiving an audio signal from one or more sources, wherein the one or more sources comprises at least one of a user of the UE or one or more environmental elements;
   determining at least one of acoustic parameters or an environmental context of the user based on the received audio signal;
   generating an embedding vector representation associated with the received audio signal based on the at least one of determined acoustic parameters and determined environmental context by using a machine learning (ML)-based embedding generator model;
   comparing the generated embedding vector representation with one or more prestored embedding vector representations; and
   detecting the wakeup command in the received audio signal based on determined environmental context and comparison of the generated embedding vector representation with the one or more pre-stored embedding vector representations.

2. The method of claim 1,
   wherein the audio signal comprises at least one of a wakeup signal or a noise signal, and
   wherein the noise signal is generated by the one or more environmental elements.

3. The method of claim 1, wherein the acoustic parameters associated with the user and an environment of the user comprise at least one of a pitch, an intensity, or a magnitude of the received audio signal.

4. The method of claim 1,
   wherein determined environmental context includes information associated with one or more objects located in vicinity of the UE and an occurrence of one or more activities in the vicinity of the UE producing the audio signals, and
   wherein the information comprises identification information, location information, and status information.

5. The method of claim 1, wherein the one or more pre-stored embedding vector representations correspond to vector representations associated with at least one of a combination of a set of true wakeups and one or more environmental contexts of the user, or a combination of a set of false wakeups and the one or more environmental contexts of the user.

6. The method of claim 5, further comprising:
   sending the one or more prestored embedding vector representations associated with the UE from the UE to one or more other UEs associated with the user via one or more techniques.

7. The method of claim 1, further comprising:
   determining, via the voice assistant, an occurrence of one of a true wakeup instance or a false wakeup instance for the generated embedding vector representation;

associating the determined one of the true wakeup instance or the false wakeup instance with the generated embedding vector representation, the determined acoustic parameters, and determined environmental context;

storing the generated embedding vector representation in an embedding vector repository upon associating the determined one of the true wakeup instance or the false wakeup instance with the generated embedding vector representation, the determined acoustic parameters, and determined environmental context; and training an ML-based classification model by using the embedding vector repository upon storing the generated embedding vector representation in the embedding vector repository.

8. The method of claim 7, wherein the determining of the occurrence of one of the true wakeup instance or the false wakeup instance comprises:

receiving a set of wake-up commands from the user;

predicting a score for each of the set of wake-up commands;

determining if the predicted score is less than a predefined threshold score;

rejecting the set of wake-up commands upon determining that the predicted score is less than the predefined threshold score;

identifying a pattern associated with the prediction of the score and the rejection of the set of wake-up commands based on the generated score and the predefined threshold score; and determining a number of attempts by the user for waking-up the voice assistant based on the identified pattern.

9. The method of claim 8, wherein the determining of the occurrence of one of the true wakeup instance or the false wakeup instance comprises:

performing a set of acoustic operations on audio signals associated with the received wake-up commands for a predefined time period based on predicted number of attempts, wherein the set of acoustic operations comprise noise suppression, speech boosting, and voice filtering;

monitoring the identified pattern associated with the prediction of the score to evaluate the audio signals upon performing the set of acoustic operations, wherein the audio signals are evaluated in time points at which the number of attempts are predicted;

determining if a wake-up signal is present in the received set of wake-up commands based on a result of evaluation of the audio signals by using a signal detection-based ML model;

generating an embedding vector representation associated with the audio signals upon determining that the wake-up signal is present in the received set of wake-up commands;

associating the true wakeup instance with the generated embedding vector representation; and storing the generated embedding vector representation in the embedding vector repository upon associating the true wakeup instance with the generated embedding vector representation.

10. The method of claim 7, further comprising:

determining that the voice assistant is unable to obtain a natural label for the generated embedding vector representation of the audio signal;

generating a score for the wakeup command in the audio signal based on a number of wakeup attempts, the embedding vector representation, the acoustic parameters, and the environmental context of the user;

associating the generated score with the embedding vector representation, the wakeup command, the acoustic parameters, and the environmental context; and storing the generated embedding vector representation in the embedding vector repository upon associating the generated score with the embedding vector representation, the wakeup command, the acoustic parameters, and the environmental context.

11. The method of claim 10, further comprising:

determining that the voice assistant is unable to determine the occurrence of one of the true wakeup instance or the false wakeup instance for the embedding vector representation of the audio signal;

obtaining an alternate wakeup command from the embedding vector repository based on the embedding vector representation, the acoustic parameters, the environmental context associated with the audio signal and the generated score; and recommending the obtained alternate wakeup command to the user via one or more modes.

12. The method of claim 1, wherein the detecting of the wakeup command in the received audio signal comprises:

classifying the received audio signal into one of a true wakeup instance or a false wakeup instance by using trained ML-based classification model.

13. A system for detecting a wakeup command for a voice assistant implemented in a user equipment (UE), the system includes one or more processors configured to:

receive an audio signal from one or more sources, wherein the one or more sources comprises at least one of a user of the UE or one or more environmental elements, determine at least one of acoustic parameters or an environmental context of the user based on the received audio signal, generate an embedding vector representation associated with the received audio signal based on the at least one of determined acoustic parameters and determined environmental context by using a machine learning (ML)-based embedding generator model, compare the generated embedding vector representation with one or more prestored embedding vector representations, and detect the wakeup command in the received audio signal based on determined environmental context and comparison of the generated embedding vector representation with the one or more prestored embedding vector representations.

14. The system of claim 13, wherein the audio signal comprises at least one of a wakeup signal or a noise signal, and wherein the noise signal is generated by the one or more environmental elements.

15. The system of claim 13, wherein the acoustic parameters associated with the user and an environment of the user comprise at least one of a pitch, an intensity, or a magnitude of the received audio signal.

16. The system of claim 13, wherein determined environmental context includes information associated with one or more objects located in vicinity of the UE and an occurrence of one or more activities in the vicinity of the UE producing the audio signals, and wherein the information comprises identification information, location information, and status information.

17. The system of claim 13, wherein the one or more pre-stored embedding vector representations correspond to vector representations associated with at least one of a combination of a set of true wakeups and one or more environmental contexts of the user, or a combination of a set of false wakeups and the one or more environmental contexts of the user.

18. The system of claim 17, wherein the one or more processors are further configured to:

send the one or more prestored embedding vector representations associated with the UE from the UE to one or more other UEs associated with the user via one or more techniques.

19. The system of claim 13, wherein the one or more processors are further configured to:

determine, via the voice assistant, an occurrence of one of a true wakeup instance or a false wakeup instance for the generated embedding vector representation, associate the determined one of the true wakeup instance or the false wakeup instance with the generated embedding vector representation, the determined acoustic parameters, and determined environmental context, store the generated embedding vector representation in an embedding vector repository upon associating the determined one of the true wakeup instance or the false wakeup instance with the generated embedding vector representation, the determined acoustic parameters, and determined environmental context, and train an ML-based classification model by using the embedding vector repository upon storing the generated embedding vector representation in the embedding vector repository.

20. The system of claim 19, wherein, in determining the occurrence of one of the true wakeup instance or the false wakeup instance, the one or more processors are further configured to:

receive a set of wake-up commands from the user, predict a score for each of the set of wake-up commands, determine if the predicted score is less than a predefined threshold score, reject the set of wake-up commands upon determining that the predicted score is less than the predefined threshold score, identify a pattern associated with the prediction of the score and the rejection of the set of wake-up commands based on the generated score and the predefined threshold score, and determine a number of attempts by the user for waking-up the voice assistant based on the identified pattern.

\*   \*   \*   \*   \*